US006812948B1

(12) United States Patent
Komiya et al.

(10) Patent No.: US 6,812,948 B1
(45) Date of Patent: Nov. 2, 2004

(54) LIGHT BEAM SCANNING APPARATUS AND IMAGE FORMING APPARATUS

(75) Inventors: Kenichi Komiya, Kawasaki (JP); Koji Tanimoto, Kawasaki (JP); Jun Sakakibara, Tokyo (JP); Naoaki Ide, Shizuoka (JP); Toshimitsu Ichiyanagi, Zushi (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/461,771

(22) Filed: Dec. 15, 1999

(30) Foreign Application Priority Data

Dec. 15, 1998 (JP) .......................................... 10-356023

(51) Int. Cl.[7] ................................................. B41J 2/435
(52) U.S. Cl. ...................................... 347/236; 347/246
(58) Field of Search ................................ 347/234, 235, 347/236, 237, 246, 247, 248, 250, 233; 382/312; 372/50

(56) References Cited

U.S. PATENT DOCUMENTS

| 4,404,571 | A |   | 9/1983  | Kitamura ............... 347/235 |
| 4,713,672 | A | * | 12/1987 | Horihata et al. .......... 347/246 |
| 4,823,151 | A |   | 4/1989  | Miura .................... 347/235 |
| 5,220,348 | A |   | 6/1993  | D'Aurelio .............. 347/236 |
| 5,359,434 | A |   | 10/1994 | Nakao et al. ............. 358/481 |
| 5,432,537 | A |   | 7/1995  | Imakawa et al. .......... 347/135 |
| 5,799,029 | A | * | 8/1998  | Rossi et al. .............. 372/50 |
| 5,970,184 | A | * | 10/1999 | Katoh et al. ............. 382/312 |

FOREIGN PATENT DOCUMENTS

| JP | 1-105268  |   | 4/1989  |           |
| JP | 5-188739  |   | 7/1993  |           |
| JP | 6-64220   |   | 3/1994  |           |
| JP | 8-174902  | * | 7/1996  | .......... B41J/2/44 |
| JP | 9-258125  |   | 10/1997 |           |
| JP | 9-314901  |   | 12/1997 |           |
| JP | 10-76704  |   | 3/1998  |           |
| JP | 10-209545 |   | 8/1998  |           |

* cited by examiner

Primary Examiner—Hai Pham
(74) Attorney, Agent, or Firm—Foley & Lardner LLP

(57) ABSTRACT

In a digital copying machine using a multi-beam optical system, a sensor pattern senses a light beam directed onto the photosensitive drum and generates current according to the amount of light. The current is converted into a voltage by an operational amplifier acting as a current/voltage conversion amplifier. The output voltage of the operational amplifier is integrated by an integrator. The output of the integrator is converted into a digital signal by an A/D converter, thereby producing luminous energy sensing information. According to the luminous energy sensing information, a laser oscillator is controlled. Between the operational amplifier and integrator, a variable resistor is inserted which absorbs variations in the sensitivity of the sensor pattern or variations in the conversion characteristic of the operational amplifier.

14 Claims, 15 Drawing Sheets

LIGHT BEAM SCANNING APPARATUS AND IMAGE FORMING APPARATUS

BACKGROUND OF THE INVENTION

This invention relates to an image forming apparatus, such as a digital copying machine or a laser printer, for forming an electrostatic latent image on the photosensitive drum by scanning and exposing the surface of the photosensitive drum with a single light beam or plural light beams generated by a semiconductor laser or lasers.

In recent years, various types of digital copying machines have been developed which form images by the scanning and exposing of a light beam and by electronic photographic processing. More recently, digital copying machines of the multi-beam type have been developed which generate plural light beams and cause the beams to scan an image in units of lines simultaneously to form an image at higher speed.

A digital copying machine of the multi-beam digital type comprises semiconductor laser oscillators for generating light beams, a polyhedral rotating mirror, such as a polygon mirror, for reflecting the light beam emitted from each of the laser oscillators toward the photosensitive drum and causing each light beam to scan the surface of the photosensitive drum, and an optical system unit serving as a light beam scanning apparatus mainly composed of a collimator lens and an f-θ lens.

To produce images with high picture quality using a multi-beam optical system, light-beam power control is generally performed to equalize the optical power of each light beam on the photosensitive drum.

In the light-beam power control, a light sensing element senses the light beam directed onto the photosensitive drum and converts it into a current according to the amount of light. A current/voltage converter then converts the current outputted from the light sensing element into a voltage. An integrator then integrates the output voltage of the current/voltage converter. The output of the integrator is converted into a digital signal, thereby producing power sensing information. According to the power sensing information, the output power of the laser oscillators is controlled. As a result, the power of the light beams scanning the surface of the photosensitive drum is set at a specific value.

Furthermore, in the multi-beam type of digital copying machine, light-beam passing position control in the direction of feed is performed to form an image with high picture quality.

In the light-beam passing position control, the passing position in the feed direction perpendicular to the main scanning direction of the light beam directed onto the surface of the photosensitive drum is sensed. On the basis of the sensing result, the amount of deflection of the optical path necessary to set the passing position of the light beam at the desired position on the photosensitive drum is calculated. The optical path deflecting means, such as a galvanomirror, is controlled on the basis of the calculated amount of deflection of the optical path, thereby deflecting the passing position of the light beam on the photosensitive drum.

In the conventional light-beam power control, however, the power sensing characteristic may fluctuate seriously due to variations in the sensitivity of the photodiodes constituting the light sensing element or variations in the resistance values of the current/voltage resistors. For instance, the power sensing characteristic fluctuates significantly, when the sensitivity of the photodiodes is higher or lower than the specification value, or when the values of the resistance of the current/voltage conversion resistors are larger or smaller than the design values.

As described above, when the power sensing characteristic differs from one image forming apparatus to another because of such factors as the aforementioned variations, this may permit a difference in the density of the output image to occur between image forming apparatuses, which can degrade the image. To avoid the problem, the process conditions, including the condition for development, must be adjusted for each image forming apparatus.

Furthermore, in the conventional light-beam passing position control, when a certain laser oscillator or galvanomirror has malfunctioned, light-beam passing position control in the feed direction is not performed properly, degrading the picture quality seriously.

In such a case, a message, such as an error message or a serviceman call, is generally displayed and the use of the apparatus is stopped. When the image forming apparatus with the multi-beam optical system, which features high-speed recording, is left out of use (or in the down state), this gives the users a lot of trouble.

BRIEF SUMMARY OF THE INVENTION

It is, accordingly, an object of the present invention to provide a light-beam scanning apparatus which features very small fluctuations in the power sensing characteristic of light-beam power sensing means.

Another object of the present invention is to provide an image forming apparatus capable of forming an image with high picture quality without any difference in the density of the output image between image forming apparatuses caused by variations in the light-beam power sensing characteristic in an image forming apparatus using a multi-beam optical system.

Still another object of the present invention is to provide an image forming apparatus capable of continuing to form an image without stopping until a serviceman has remedied the problem, when the light-beam generating means or optical-path deflecting means has malfunctioned in an image forming apparatus using a multi-beam optical system.

In order to achieve the above objects, according to one aspect of the present invention, there is provided a light-beam scanning apparatus comprising:

light beam generating means for generating a light beam and being able to change its output power; scanning means for scanning a scan surface with the light beam generated at the light beam generating means; light sensing means for sensing the light beam directed by the scanning means so that it may scan the scan surface and outputting a light sense signal proportional to the luminous energy of the light beam; light beam power sensing means which senses the power of the light beam on the basis of the light sense signal outputted from the light sensing means and includes adjusting means for adjusting more than one unit of the light beam scanning apparatus so that their power sensing characteristics may be equalized; and light beam power control means for controlling the power of the light beam generating means on the basis of the sensing result of the light beam power sensing means so that the power of the light beam scanning the scan surface may have a specific value.

The power of the light beam adjusted to a specific power by an optical power meter or the like is measured by the light beam power sensing means provided in the beam scanning apparatus. The measured value is displayed on the control panel. The value of the power sensing characteristic change variable resistor in the light beam power sensing means is adjusted so that the measured value may have a specific value. As a result, a light beam scanning apparatus with very small variations in the power sensing characteristic of the light beam power sensing means is provided.

According to another aspect of the present invention, there is provided an image forming apparatus which forms an image on an image retaining member by causing light beams to scan and expose the surface of the image retaining member, comprising: plural light beam generating means for generating light beams; scanning means for scanning the surface of the image retaining member with the light beams generated at the plural light beam generating means; light beam position sensing means for sensing the passing positions of the light beams in the direction perpendicular to the direction in which the light beams scan, the light beams being directed by the scanning means so that they may scan the surface of the image retaining member; calculation means for calculating the amount of deflection of the optical path to deflect the passing positions of the light beams to desired positions on the image retaining member on the basis of each sensing result of the light beam position sensing means; plural optical path deflection means which are provided for the light beams in a one-to-one ratio and are used to change each of the passing positions of the light beams on the image retaining member on the basis of the amount of deflection of each optical path calculated at the calculation means; malfunction sensing means for sensing that a malfunction has occurred in the plural light beam generating means; and control means for stopping the light-emitting operation of the light beam generating means that has malfunctioned, when the malfunction sensing means has sensed that a malfunction has occurred in the light beam generating means, and causing the image formation to be continued by the operation of the remaining good light beam generating means.

In the image forming apparatus using a multi-beam optical system, if a malfunction has occurred in the light beam generating means, such as semiconductor lasers, and the optical path deflection means, such as galvanomirrors, the light-emitting operation of the light beam generating means that has malfunctioned is stopped and the image formation is continued by the operation of the remaining good light beam generating means. Consequently, it is possible to provide an image forming apparatus capable of continuing to form an image without stopping until a serviceman has repaired the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention, FIG. 1 schematically shows the configuration of a digital copying machine according to a first embodiment of the present invention.

DETAILED DESCRIPTION OF THE INVENTION

Hereinafter, referring to the accompanying drawings, embodiments of the present invention will be explained.

A first embodiment of the present invention will be explained below.

Figure 1:
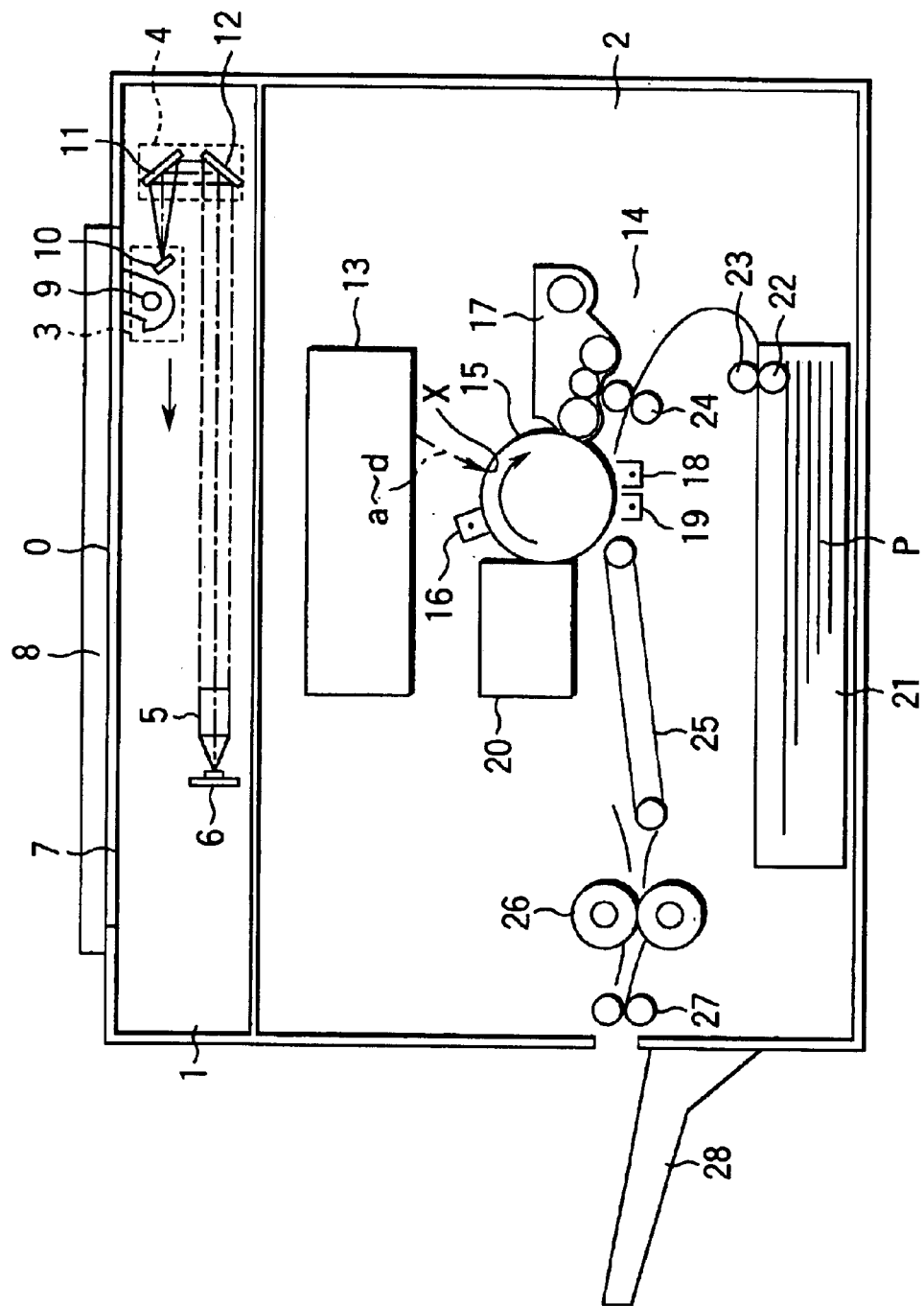

FIG. 1 shows the configuration of a digital copying machine serving as an image forming apparatus to which a light beam scanning device according to the first embodiment is applied. Specifically, the digital copying machine comprises a scanner section 1 acting as image reading means and a printer section 2 acting as image forming means. The scanner section 1 is composed of a first carriage 3 and a second carriage 4 both movable in the direction of the arrow in the figure, an image formation lens 5, and a photoelectric conversion element 6.

In FIG. 1, a document 0 is placed on an document table 7 made of transparent glass, with the printed side downward. The placement reference of the document 0 is at the front right of the lateral side of the document table 7. An operable document holding cover 8 presses the document 0 against the document table 7.

A light source 9 illuminates the document 0. The reflected light from the document passes through mirrors 10, 11, 12 and the image formation lens 5 and is gathered on the light-receiving surface of the photoelectric conversion element 6. The first carriage 3 on which the light source 9 and mirror 10 are mounted and the second carriage 4 on which the mirrors 11, 12 are mounted are moved at a relative speed in the ratio of 2:1 so as to make the optical path length constant. A carriage driving motor (not shown) moves the first carriage 3 and second carriage 4 from right to left in synchronization with a read timing signal.

In this way, the image of the document O on the document table 7 is read line by line by the scanner section 1. The output of the scanner section 1 is converted by an image processing section (not shown) into an 8-bit digital image signal indicating the gradation of image.

The printer section 2 is composed of an optical system unit 13 and an image forming section 14 using an electronic photographic system capable of forming an image on a sheet of paper P serving as a medium on which an image is to be formed. Specifically, the image signal read from the document O by the scanner section 1 is processed at the image processing section (not shown) and then converted into laser beams (hereinafter, referred to as light beams) from semiconductor laser oscillators. The printer section of the embodiment uses a multi-beam optical system using more than one (two or more) semiconductor laser oscillator.

The configuration of the optical system unit 13 will be explained in detail later. The semiconductor laser oscillators provided in the unit emit light according to the laser modulation signal outputted from the image processing section (not shown). The light beams from the semiconductor laser oscillators are reflected by a polygon mirror to form scanning light, which is then outputted to the outside of the unit.

The light beams from the optical system unit 13 form a spot with the necessary resolution at an exposure position X on a photosensitive drum 15 serving as an image retaining member. They scan and expose the surface of the photosensitive drum 15. This makes an electrostatic latent image corresponding to the image signal on the photosensitive drum 15.

Around the photosensitive drum 15, there are provided an electrifying charger 16 for electrifying the surface of the drum, a developing unit 17, a transfer charger 18, a peeling charger 19, and a cleaner 20. The photosensitive drum 15 is rotated by a driving motor (not shown) at a specific circumferential speed. It is electrified by the electrifying charger 16 facing the surface of the drum. More than one light beam (or scanning light beam) forms a spot at the exposure position X on the electrified photosensitive drum 15.

The electrostatic latent image formed on the photosensitive drum 15 is developed with the toner (or developer) from the developing unit 17. The toner image formed on the photosensitive drum 15 is transferred at the transfer position by the transfer charger 18 onto the sheet P fed with suitable timing by the paper feed system.

In the paper feed system, sheets of paper P in a paper feed cassette 21 at the bottom are taken out one by one by a supply roller 22 and a separation roller 23. The sheet P is sent to a resist roller 24, which carries the sheet to the transfer position with specific timing. In the downstream side of the transfer charger 18, there are provided a sheet transport mechanism 25, a fixing unit 26, and delivery rollers 27 for ejecting the sheet P on which an image has been formed. With this arrangement, the fixing unit 26 fixes the toner image on the sheet P on which the toner image has been transferred. Thereafter, the sheet is ejected via the delivery rollers 27 into a delivered sheet tray 28 on the outside.

After the image has been transferred from the photosensitive drum 15 to the sheet P, the remaining toner on the surface of the drum is removed by the cleaner 20, which returns the drum to the initial state. In this state, the drum stands by to form the next image.

The repetition of the aforementioned processes causes images to be formed continuously.

As described above, the document O on the document table 7 is read at the scanner section 1. The read data is subjected to a series of processes at the printer section 2 and then recorded on the sheet P in the form of a toner image.

The following is explanation of the optical system unit 13.

Figure 2:
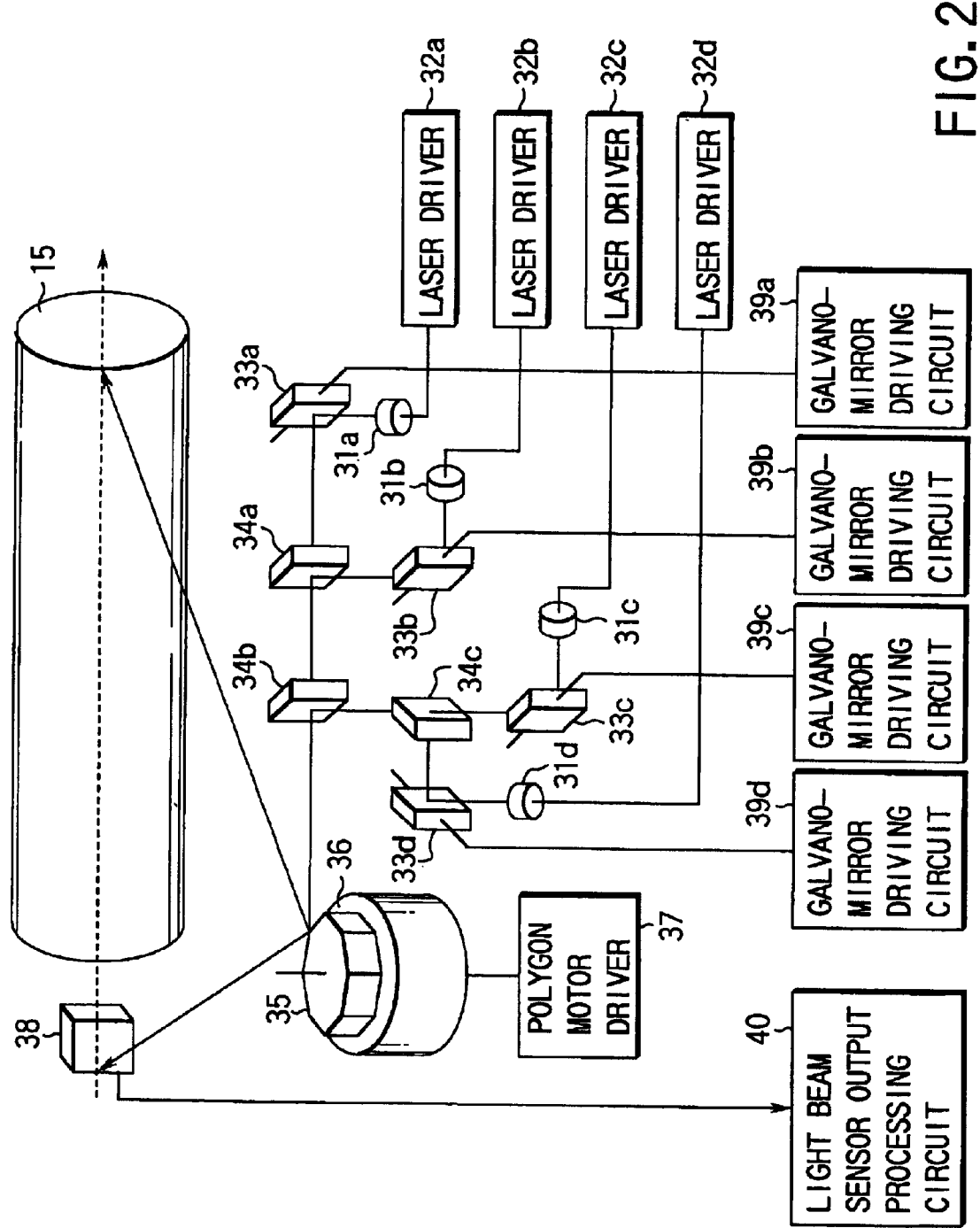
FIG. 2 shows the configuration of the optical system unit and the location of the photosensitive drum.

FIG. 2 shows the configuration of the optical system unit 13 and the location of the photosensitive drum 15. The optical system unit 13 includes, for example, semiconductor laser oscillators 31a, 31b, 31c, 31d, serving as four light beam generating means. The semiconductor laser oscillators 31a, 31b, 31c, 31d scan the respective scanning lines simultaneously, enabling an image to be formed at high speed without extremely increasing the number of revolutions of the polygon mirror.

Specifically, the laser oscillator 31a is driven by a laser driver 32a. The light beam outputted passes through a collimator lens (not shown) and strikes a galvanomirror 33a serving as optical path deflecting means. The light beam reflected from the galvanomirror 33a passes through a half mirror 34a and a half mirror 34b and strikes a polygon mirror 35 acting as a polyhedral rotating mirror.

The polygon mirror 35 is rotated at a constant speed by a polygon motor 36 driven by a polygon motor driver 37. This causes the reflected light from the polygon mirror 35 to scan in a constant direction at an angular velocity determined by the number of revolutions of the polygon motor 36. The light beam deflected by the polygon mirror 35 passes through an f-θ lens (not shown). The f-θ characteristic of the lens enables the light beam to scan the light-receiving surface of a light beam sensing unit 38 and the surface of the photosensitive drum 15 at a constant speed. The beam sensing unit 38 serves as light beam position sensing means, light beam passing timing sensing means, and light beam power sensing means.

The laser oscillator 31b is driven by a laser driver 32b. The light beam outputted passes through a collimator lens (not shown) and is reflected by a galvanomirror 33b and then by the half mirror 34a. The reflected light from the half mirror 34a passes through the half mirror 34b and strikes the polygon mirror 35. The optical path through which the beam travels after the polygon mirror 35 is the same as that for the laser oscillator 31a. Namely, the light beam passes through the f-θ lens (not shown) and scans the light-receiving surface of the light beam sensing unit 38 and the surface of the photosensitive drum 15 at a constant speed.

The laser oscillator 31c is driven by a laser driver 32c. The light beam outputted passes through a collimator lens (not shown) and is reflected by a galvanomirror 33c. The reflected light passes through a half mirror 34c, is reflected by the half mirror 34b, and strikes the polygon mirror 35. The optical path through which the beam travels after the polygon mirror is the same as that for the laser oscillator 31a or 31b. Namely, the light beam passes through the f-θ lens (not shown) and scans the light-receiving surface of the light beam sensing unit 38 and the surface of the photosensitive drum 15 at a constant speed.

The laser oscillator 31d is driven by a laser driver 32d. The light beam outputted passes through a collimator lens (not shown) and is reflected by a galvanomirror 33d. The reflected light is further reflected by the half mirror 34c and then by the half mirror 34b, and strikes the polygon mirror 35. The optical path through which the beam travels after the polygon mirror 35 is the same as that for the laser oscillator 31a, 31b, or 31c. Namely, the light beam passes through the f-θ lens (not shown) and scans the light-receiving surface of the light beam sensing unit 38 and the surface of the photosensitive drum 15 at a constant speed.

Each of the laser drivers 32a to 32d includes an automatic power control (APC) circuit. They are designed to cause the laser oscillators 31a to 31d respectively to emit light constantly at the light-emitting power level set by a main control section (CPU) 51, which will be explained later.

The light beams from the separate laser oscillators 31a, 31b, 31c, 31d are combined at the half mirrors 34a, 34b, 34c to form four light beams, which travel toward the polygon mirror 35.

This enables the four light beams to scan the surface of the photosensitive drum 15 simultaneously. As a result, if the number of revolutions of the polygon mirror 35 is the same, use of the four light beams enables an image to be recorded at a speed four times as fast as that achieved by use of a single light beam in the prior art.

The galvanomirrors 33a, 33b, 33c, 33d are for adjusting (or controlling) the positional relationship between the light beams in the direction of feed. Galvanomirror driving circuits 39a, 39b, 39c, 39d are connected to the galvanomirrors 33a, 33b, 33c, 33d respectively.

The light beam sensing unit 38 is for sensing the passing position, passing timing, and power of each of the four light beams. The unit is provided near one end of the photosensitive drum 15 in such a manner that the light-receiving surface of the unit is flush with the surface of the photosensitive drum 15. Control of the galvanomirrors 33a, 33b, 33c, 33d corresponding to the respective light beams (or image formation position control in the direction of feed), control of the light-emitting power (or intensity) of the laser oscillators 31a, 31b, 31c, 31d, and control of the light emitting timing (or image formation position control in the direction of main scanning) are performed on the basis of the sense signal from the light beam sensing unit 38. A light beam sensor output processing circuit 40 is connected to the light beam sensing unit 38 to generate the signals for performing the above controls.

The following is explanation of the control system.

Figure 3:
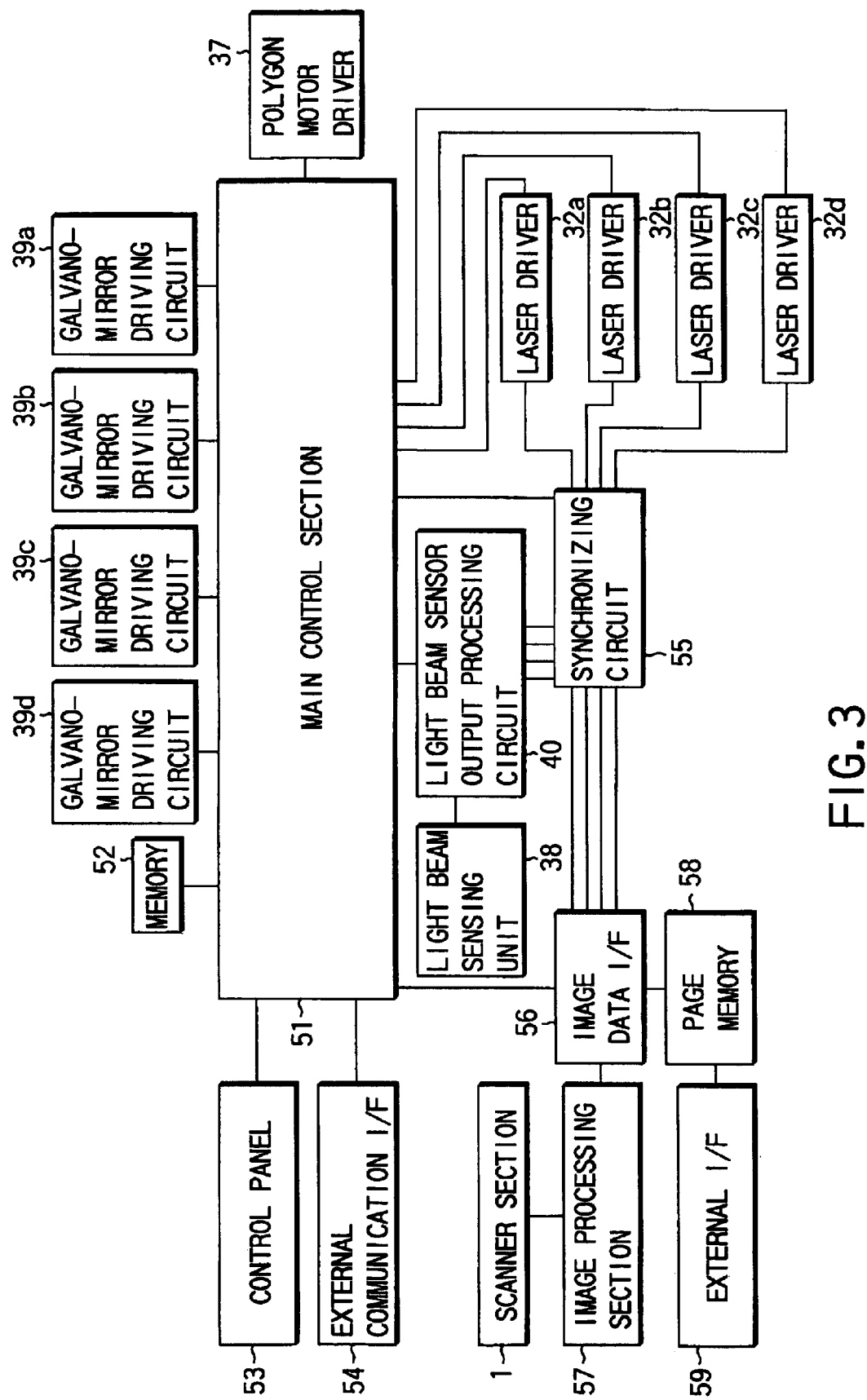
FIG. 3 is a block diagram of the control system that mainly controls the optical system.

FIG. 3 shows the control system for mainly controlling the multi-beam optical system. Numeral 51 indicates a main control section which is composed of, for example, a CPU, and supervises the overall control. Connected to the main control section are a memory 52, a control panel 53, an external communication interface (I/F) 54, the laser drivers 32a, 32b, 32c, 32d, the polygon mirror motor driver 37, the galvanomirror driving circuits 39a, 39b, 39c, 39d, the light beam sensor output processing circuit 40 serving as signal processing means, a synchronizing circuit 55, and an image data interface (I/F) 56.

The image data I/F 56 is connected to the synchronizing circuit 55. An image processing section 57 and a page memory 58 are connected to the image data I/F 56. The scanner section 1 is connected to the image processing section 57. An external interface (I/F) 59 is connected to the page memory 58.

The flow of image data in forming an image will be explained briefly.

As explained earlier, in a copying operation, the image of the document O on the document table 7 is read by the scanner section 1 and the read signal is sent to the image processing section 57. The image processing section 57 subjects the image signal from the scanner section 1 to known shading correction, various filtering processes, gray level processing, and gamma correction.

The image data from the image processing section 57 is sent to the image data I/F 56. The image data I/F 56 distributes the image data to the four laser drivers 32a, 32b, 32c, and 32d.

The synchronizing circuit 55 generates a clock synchronizing with the timing with which each light beam passes over the light beam sensing unit 3B and sends the image data from the image data I/F 56 in synchronization with the clock to the laser drivers 32a, 32b, 32c, and 32d as a laser modulation signal.

Transferring the image data in synchronization with the scanning of each light beam enables an image to be formed (in the proper position) synchronously in the direction of main scanning.

The synchronizing circuit 55 includes a sample timer and a logic circuit. The sample timer forces the laser oscillators 31a, 32b, 31c, 31d to emit light in non-image areas and controls the power of each light beam. The logic circuit causes the laser oscillators 31a, 32b, 31c, 31d for the respective light beams to emit light in the order of the beams over the light beam sensing unit 38 to adjust the light emitting timing of each light beam.

The control panel 53 is a man-machine interface for starting a copying operation or setting the number of sheets of paper.

The digital copying machine of the first embodiment can not only make copies but also form images from the image data externally supplied via the external I/F 59 connected to the page memory 58. The image data supplied from the external I/F 59 is temporarily stored in the page memory 58 and then sent to the synchronizing circuit 55 via the image data I/F 56.

When the digital copying machine is externally controlled via a network, the external communication I/f 54 serves as the control panel 53.

The galvanomirror driving circuits 39a, 39b, 39c, and 39d are circuits for driving the galvanomirrors 33a, 33b, 33d, and 33d according to the specified values from the main control section 51. Therefore, the main control section 51 can control the angles of the galvanomirrors 33a, 33b, 33d, and 33d freely via the galvanomirror driving circuits 39a, 39b, 39c, and 39d.

The polygon motor driver 37 is a driver for driving the polygon motor 36 for rotating the polygon mirror 35 that swings the four light beams. The main control section 51 instructs the polygon motor driver 37 to start and stop the rotation or change the number of revolutions. Changing the number of revolutions is effected when the number of revolutions is reduced below a specific number of revolutions as the need arises, in determining the passing position of a light beam with the light beam sensing unit 38.

The laser drivers 32a, 32b, 32c, 32d not only emit laser light according to the laser modulation signal synchronizing with the scanning of the light beam from the synchronizing circuit 55 but also forces the laser oscillators 31a, 31b, 31c, 31d to emit light according to the forced light-emitting signal from the main control section 51, regardless of the image data.

The main control section 51 sets the power produced by each of the laser oscillators 31a, 31b, 31c, 31d in the respective laser drivers 32a, 32b, 32c, 32d. The setting of the light-emitting power is changed according to changes in the processing conditions or the sensing of the passing position of the light beam.

The memory 52 is for storing the necessary data for control. It stores, for example, the controlled variables for the galvanomirrors 33a, 33b, 33c, 33d, the circuit characteristic for sensing the passing position of a light beam (or the offset value of an amplifier), and the order in which the light beams arrive. This enables the optical system unit 13 to be brought into the image formation mode immediately after the power supply has been turned on.

The following is explanation of the light beam sensing unit 38.

Figure 4:
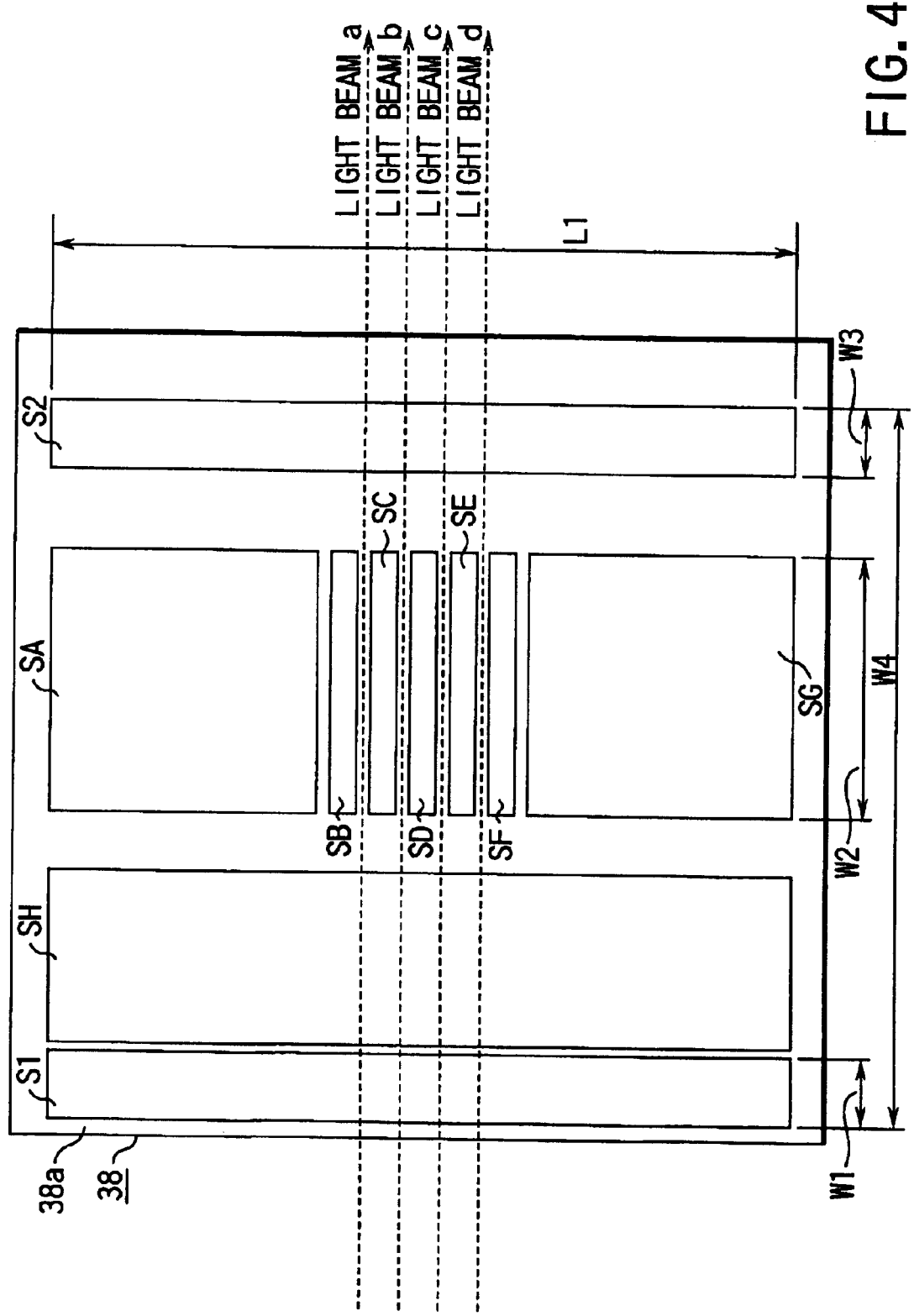
FIG. 4 schematically shows the configuration of the light beam sensing unit.

FIG. 4 pictorially shows how the structure of the light beam sensing unit 38 is related to the direction in which the light beams scan. The four light beams a to d from the four semiconductor laser oscillators 31a, 31b, 31c, 31d scan from left to right as the polygon mirror 35 rotates, traversing over the light beam sensing unit 38.

The light beam sensing unit 38 comprises two oblong sensor patterns S1, S2 acting as first light sensing elements, seven sensor patterns SA, SB, SC, SD, SE, SF, SG acting as second and third light sensing elements and sandwiched between the two sensor patterns S1, S2, a sensor pattern SH provided next to the sensor pattern S1 (or immediately to the right of the sensor pattern S1) as a fourth light sensing element, and a holding substrate 38a for integrally holding the sensor patterns S1, S2, SA, SB, SC, SD, SE, SF, SG, SH. The sensor patterns S1, S2, SA to SG, SH are composed of, for example, photodiodes.

The sensor pattern S1 is a pattern that senses the passing of a light beam and generates a reset signal (or an integration start signal) for an integrator explained later. The sensor pattern S2 is a pattern that senses the passing of a light beam and generates a conversion start signal for an A/D converter explained later. Each of the sensor patterns SA to SG is a pattern that senses the passing of a light beam. The sensor pattern SH is a pattern for sensing the power of a light beam.

As shown in FIG. 4, the sensor patterns S1, S2 are formed oblong in the direction perpendicular to the direction in which the light beams scan so that the light beams a to d deflected by the polygon mirror 35 never fail to traverse them, regardless of the positions of the galvanomirrors 33a to 33d. For example, in the first embodiment, the width W1 and width W3 in the direction of light beam scanning are 200 $\mu$m, whereas the length L1 in the direction perpendicular to the direction of light beam scanning is 2000 $\mu$m.

The sensor patterns SA to SG are arranged in such a manner that they are stacked one on top of another in the direction perpendicular to the direction of light beam scanning between the sensor patterns S1 and S2 as shown in FIG. 4. The length along which they are arranged is L1, the same length as that of the sensor patterns S1, S2. The width W2 of each of the sensor patterns SA to SG in the direction of light beam scanning is, for example, 600 $\mu$m.

As seen from FIG. 4, the sensor pattern SH has a length of L1, the same length as that of the sensor patterns S1, S2, and is of a sufficiently large size in the direction of feed (or in the direction perpendicular to the direction of light beam scanning). When a light beam crosses the light beam sensing unit 38, it never fails to cross over the sensor pattern SH.

Each of the sensor patterns SB to SF takes the form of a rectangle of, for example, 32.3 $\mu$m×600 $\mu$m. A very small gap of about 10 $\mu$m is made between them in the direction perpendicular to the direction of light beam scanning.

Accordingly, the pitch between the gaps is 42.3 $\mu$m. The gap between the sensor patterns SA and SB and that between the sensor patterns SF and SG are also set to about 10 $\mu$m. The width of the sensor patterns SA, SG in the direction perpendicular to the direction of light beam scanning is made greater than that of the sensor patterns SB to SF.

The details of control using the output of the light beam sensing unit 38 constructed as described above will be explained later. The gaps made in a pitch of 42.3 $\mu$m function as a target in controlling the passing position of each of the light beams a, b, c, and d so that they may be spaced at specific intervals (42.3 $\mu$m in the embodiment). Specifically, the gap made by the sensor patterns SB and SC serves as the target for the passing position of the light beam a; the gap made by the sensor patterns SC and SD serves as the target for the passing position of the light beam b; the gap made by the sensor patterns SD and SE serves as the target for the passing position of the light beam c; and the gap made by the sensor patterns SE and SF serves as the target for the passing position of the light beam d.

Figure 5:
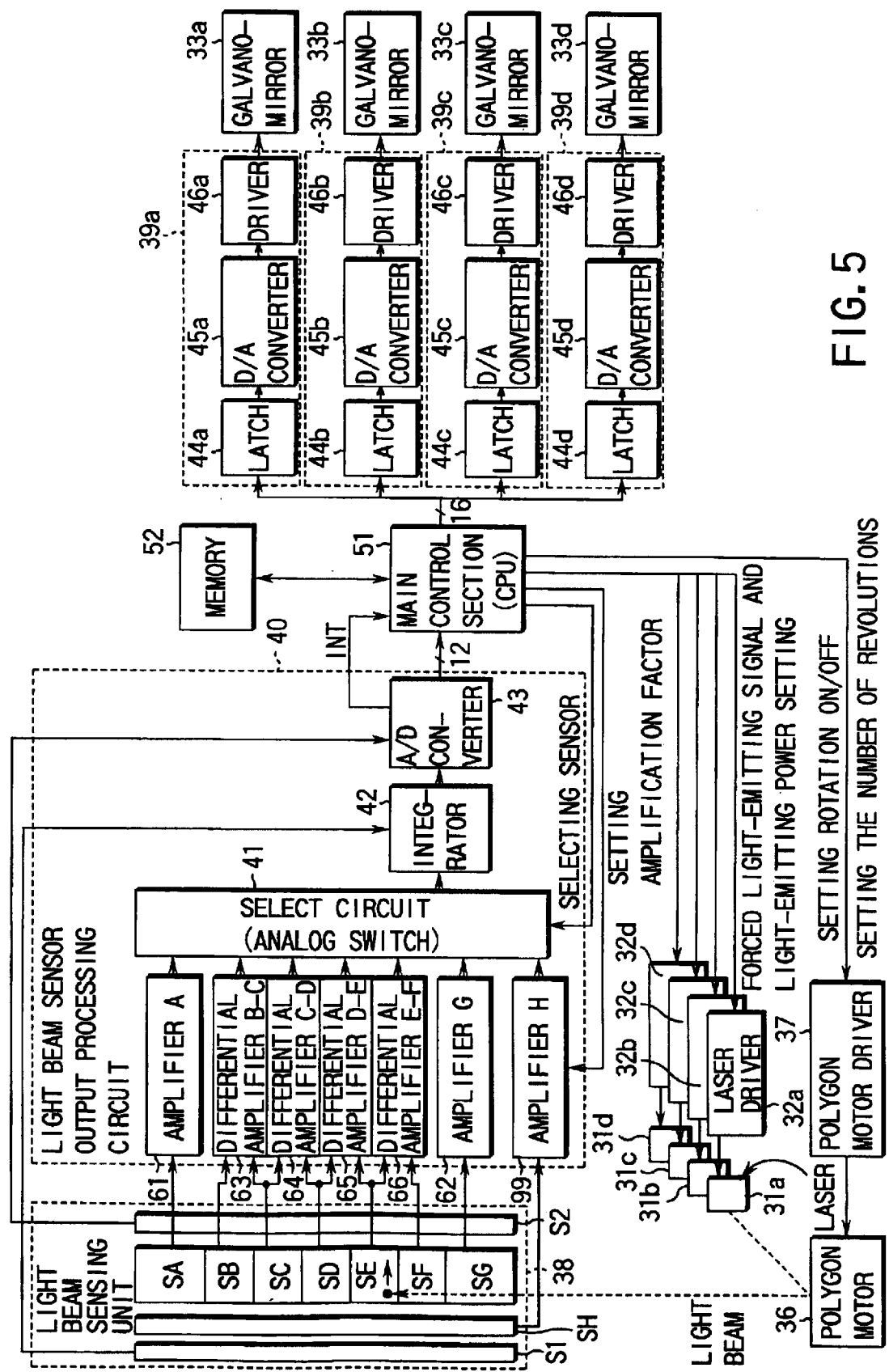
FIG. 5 is a block diagram to help explain the passing position control of a light beam using the light beam sensing unit of FIG. 4 in the first and second embodiments.

FIG. 5 is a diagram to help explain light beam passing position control when the light beam sensing unit 38 of FIG. 4 is used. The portions related to light beam control in the block diagram of FIG. 3 are extracted and represented in detail.

As explained earlier, the sensor patterns S1, S2 of the light beam sensing unit 38 output pulse signals indicating that light beams have passed. The sensor patterns SA to SG and SH output independent signals according to the passing positions of light beams.

The output signals of the sensor patterns SA, SG, and SH are inputted to amplifiers 61, 62, 99 (hereinafter, sometimes referred to as amplifiers A, G, H), respectively. The amplification factor of each of the amplifiers 61, 62, 99 is set by the main control section 51 composed of a CPU.

The output signals of the sensor patterns SB to SF are inputted to differential amplifiers 63 to 66 (hereinafter, sometimes referred to as differential amplifiers B-C, C-D, D-E, E-F) for amplifying the difference between the adjacent output signals from the sensor patterns SB to SF, respectively. The differential amplifier 63 amplifies the difference between the output signals from the sensor patterns SB, SC; the differential amplifier 64 amplifies the difference between the output signals from the sensor patterns SC, SD; the differential amplifier 65 amplifies the difference between the output signals from the sensor patterns SD, SE; and the differential amplifier 66 amplifies the difference between the output signals from the sensor patterns SE, SF.

The output signals from the amplifiers 61 to 66 and 99 are inputted to a select circuit (or an analog switch) 41. According to a sensor select signal from the main control section (CPU) 51, the select circuit 41 selects a signal to be inputted to an integrator 42. The output signal of the amplifier selected by the select circuit 41 is integrated at the integrator 42.

The pulse signal from the sensor pattern S1 is also inputted to the integrator 42. The pulse signal from the sensor pattern S1 is used as a reset signal (integration start signal) that resets the integrator 42 and simultaneously starts a new integrating operation. The function of the integrator 42 is to remove noise and eliminate the effect of the inclination with which the light beam sensing unit 38 has been installed.

The output of the integrator 42 is inputted to an A/D converter 43. The pulse signal from the sensor pattern S2 is also inputted to the A/D converter 43. When receiving the signal from the sensor pattern S2 as an conversion start signal, the A/D converter 43 starts analog-to-digital conversion. Namely, A/D conversion is started with the timing that a light beam passes over the sensor pattern S2.

As described above, immediately before the light beams pass over the sensor patterns SA to SG, the pulse signal from the sensor pattern S1 resets the integrator 42 and at the same time, starts integration. As result, while the light beams are passing over the sensor patterns SA to SG, the integrator 42 integrates the signals indicating the passing positions of the light beams.

Then, immediately after the light beams have passed over the sensor patterns SA to SG, the pulse signal from the sensor pattern S2 triggers the A/D converter 43 to A/D convert the result of integration at the integrator 42 into a digital signal. As a result, the sense signal with less noise from which the effect of the inclined installation of the light beam sensing unit 38 has been removed in light beam passing position sensing is converted into a digital signal.

Furthermore, the laser oscillator the power of whose light beam is to be measured is forced to emit light. The polygon mirror 35 causes the light beam to swing over the light beam sensing unit 38 at a specific speed. The electric signal from the sensor pattern SH is amplified by the amplifier 99 (H). The amplified signal is integrated by the integrator 42 with the timing of the pulse signals from the sensor patterns S1, S2. The integrated signal is A/D converted by the A/D converter 43. The converted signal is supplied to the main control section 51. This enables the main control section 51 to sense the power of the light beam on the photosensitive drum 15.

After the A/D conversion, the A/D converter 43 outputs an interrupt signal INT indicating the completion of the process to the main control section 51.

The amplifiers 61 to 66 and 99, select circuit 41, integrator 42, and A/D converter 43 constitute the light beam sensor output processing circuit 40.

In this way, the digitized light beam power sensing signal and light beam position sensing signal from the light beam sensing unit 38 are inputted to the main control section 51 as relative light beam power information or light beam position information on the photosensitive drum 15. The main control section 51 determines the power or passing position of each light beam on the photosensitive drum 15.

On the basis of the relative light beam power sensing signal or light beam position sensing signal on the photosensitive drum 15, the main control section 51 sets the light-emitting power for each of the laser oscillators 31a to 31d and calculates the controlled variable for each of the galvanomirrors 33a to 33d. The results of calculation are stored in the memory 52, as the need arises. The main control section 51 sends the results of calculation to the laser drivers 32a to 32d and the galvanomirror driving circuits 39a to 39d.

As shown in FIG. 5, the galvanomirror driving circuits 39a to 39d include latches 44a to 44d for storing the results of calculation, respectively. Once the main control section 51 has written the data into the latches, the values remain unchanged until the data is updated.

The data items held in the latches 44a to 44d are converted by D/A converters 45a to 45d into analog signals (or voltages), which are then inputted to drivers 46a to 46d for driving the galvanomirrors 33a to 33d. The drivers 46a to 46d drive the galvanomirrors 33a to 33d according to the analog signals (voltages) from the D/A converters 45a to 45d.

In the embodiment, because only one of the amplified output signals of the sensor patterns SA to SG is selected by the select circuit 41, integrated, and A/D converted, the output signals of the sensor patterns SA to SG cannot be inputted to the main control section 51 at a time.

Accordingly, when the passage of a light beam is unknown, it is necessary to determine the passing position of the light beam by switching the select circuit 41 sequentially and inputting the output signals from all the sensor patterns SA to SG to the main control section 51 in sequence.

Once where the light beam is passing has been known, the position at which the light beam will pass can be estimated unless the galvanomirrors 33a to 33d have been moved seriously. Consequently, the output signals of all the sensor patterns do not always have to be inputted to the main control section 51.

Figure 6:
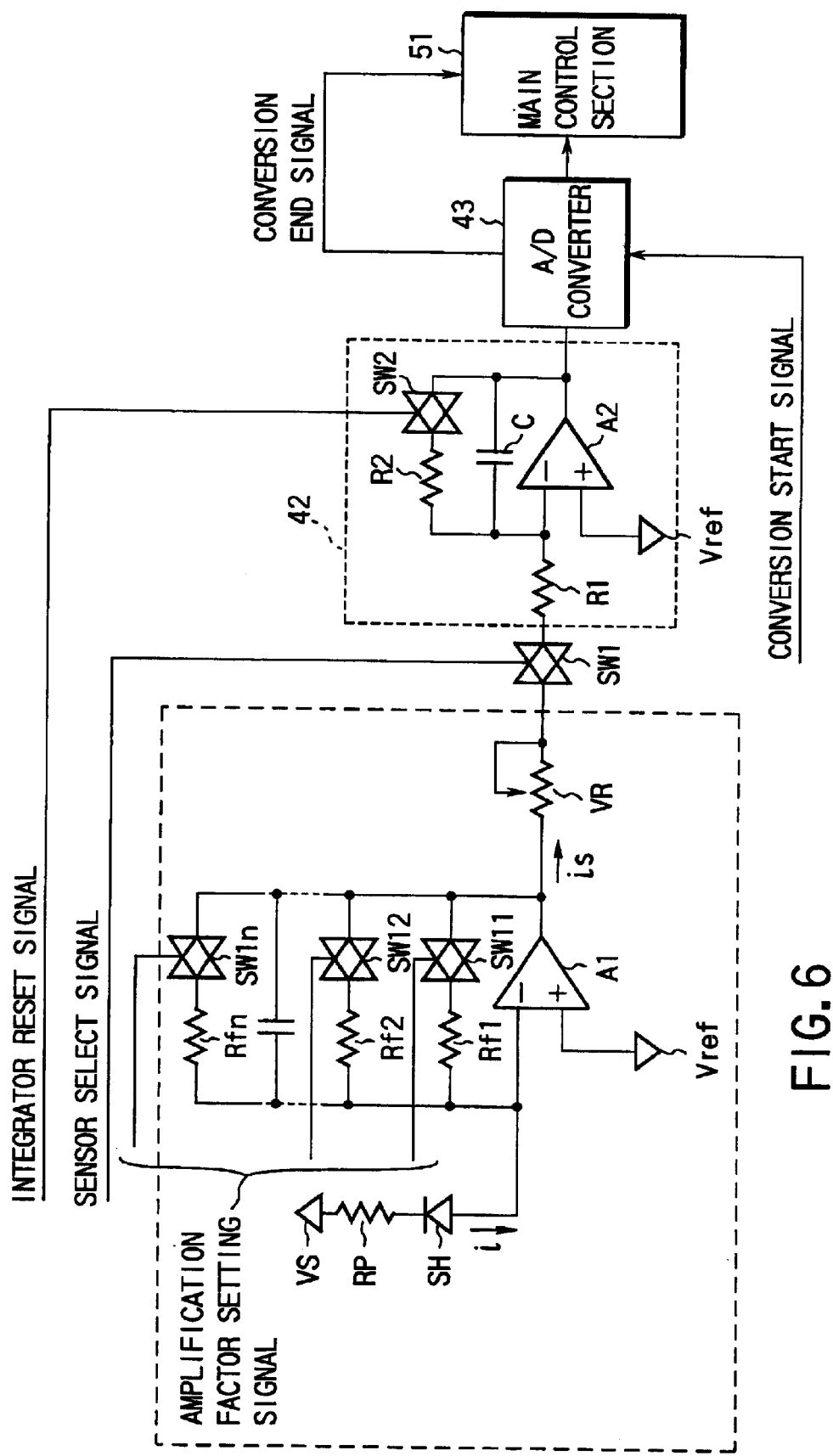
FIG. 6 is a detailed circuit diagram of the light beam power sensing section in the first embodiment.

FIG. 6 is a detailed circuit diagram of a light beam power sensing section in the light beam sensor output processing circuit 40. The light beam power sensing section is composed of the amplifier 99, integrator 42, and A/D converter 43. The light beam power sensing section shares the integrator 42 and A/D converter 43 with a feed-direction light-beam position sensing section. An analog switch SWI acting as the select circuit 41 switches between the light beam power sensing section and the feed-direction light-beam position sensing section according to the purpose.

First, the amplifier 99 will be explained. The power sensor pattern (photodiode) SH has its cathode connected to a direct-current power supply VS via a resistor RP and its anode connected to the inverting input terminal of an operational amplifier A1 acting as a current/voltage conversion amplifier. A reference voltage Vref is applied to the noninverting input terminal of the operational amplifier A1. Between the inverting input terminal of the operational amplifier A1 and the output terminal, Rf1, Rf2, . . . , Rfn are connected in parallel, with analog switches SW11, SW12, . . . , SW1n being connected in series with Rf1, Rf2, . . . , Rfn, respectively. On/off control of the analog switches SW11, SW12, . . . , SW1n is performed using the amplification factor setting signal from the main control section 51. A variable resistor acting as adjusting means for adjusting variations in the power sensing characteristic is connected between the output terminal of the operational amplifier A1 and the analog switch SW1.

If the current flowing in the sensor pattern SH as a result of light beam projection is i, the resistance values of the resistors Rf1, Rf2, . . . , Rfn set by the control section 51 is Rf, the resistance value of each of the analog switches SW11, SW12, . . . , SW1n is Ron, then the output voltage Vol of the output of the amplifier 99 (operational amplifier A1) is expressed by equation (1):

$$Vol = Vref - i \times (Rf1 + Ron) \qquad (1)$$

Next, the integrator 42 will be explained. The other end of the analog switch SW1 is connected to the inverting input terminal of an operational amplifier A2 via a resistor R1. A reference voltage Vref is applied to the noninverting input terminal of the operational amplifier A2. Between the inverting input terminal of the operational amplifier A2 and the output terminal, a capacitor C1 and a series combination of a resistor R2 and an analog switch SW2 are connected in parallel. On/off control of the analog switch SW2 is performed using the integrator reset signal from the main control section 51.

If the resistance value of the variable resistor VR is Rvr, the on resistance of the switch SW1 is Ron1, and the light beam projection time of the sensor pattern SH is t1, the output Von2 of the integrator 42 is expressed by equation (2):

$$Vo2 = -\frac{1}{C}\int_o^{t1} \text{is } dt = \frac{-Vo \times t1}{C(Rvr + Ron1 + Ron2)} \quad (2)$$

The output of the operational amplifier A2 is sent to the A/D converter 43, which converts the analog value into a digital value. When having completed the A/D conversion, the A/D converter 43 transmits a conversion end signal to the main control section 51. Receiving the conversion end signal, the main control section 51 reads the digitized light-beam position information.

Figure 7:
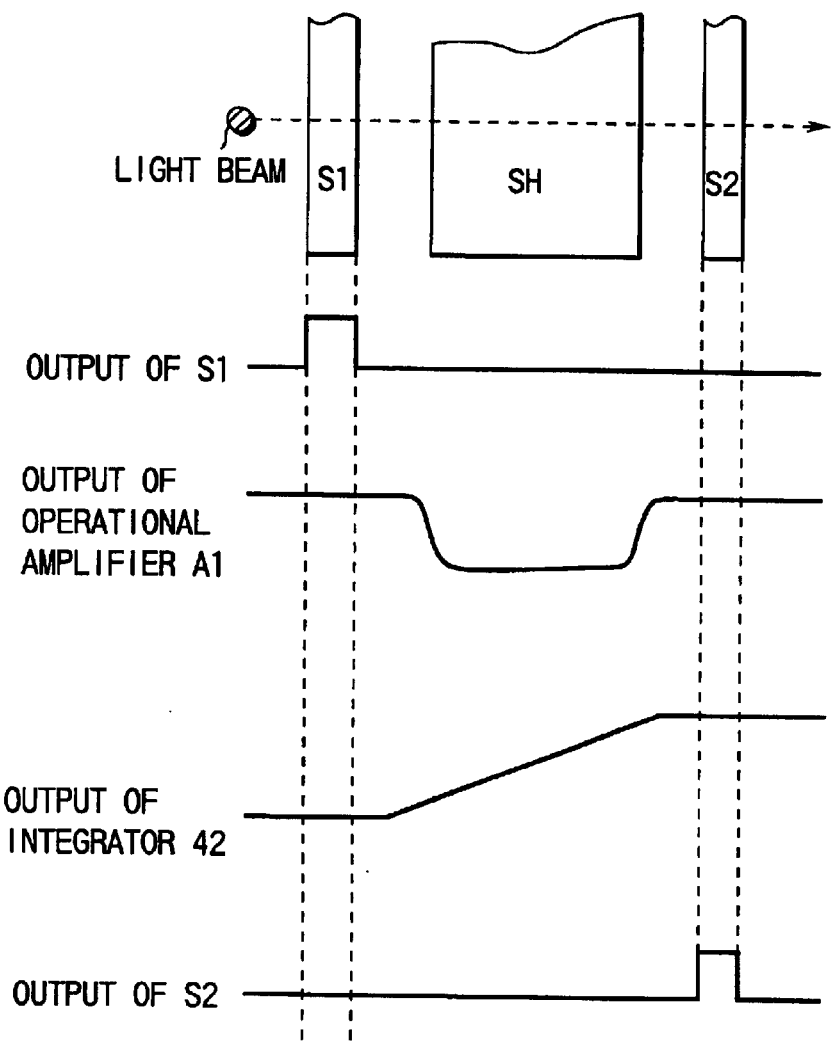
FIG. 7 is a waveform diagram to help explain the operation of the main part of the power sensing section.

Hereinafter, the power sensing operation (and power sensing control) will be explained by reference to the circuit of FIG. 6 and the waveform diagram of the main part in FIG. 7.

To effect power sensing, the amplification factor of the operational amplifier A1 is set using the amplification factor setting signal. For example, when the analog switch SW11 has been selected, only the analog switch S11 is closed and the remaining analog switches SW12 to SW1n are left open. Then, the analog switch SW1 acting as the select circuit 41 is closed using the sensor select signal, thereby allowing the output of the operational amplifier A1 to be inputted to the integrator 42.

Thereafter, the galvanomirror moves the position of the light beam to be deflected so that the position may be in the middle of the power sensor pattern SH (actually, it has only to be closer to the center to a certain extent when viewed from the edge of the sensor pattern SH).

When the light beam has passed over the sensor pattern S1, the sensor pattern S1 outputs a pulse signal. After the pulse signal is digitized by a binarization circuit (not shown), the binary signal is inputted as an integrator reset signal to the analog switch SW2, thereby resetting the integrator 42 (or discharging the charge from the integral capacitor C).

When the light beam has passed over the sensor pattern SH, the sensor pattern SH outputs the current according to the luminous energy of the light beam. The current is converted into a voltage, which is then inputted to the integrator 42. The integrator 42 integrates the output of the operational amplifier A1 and retains the charge.

When the light beam has passed over the sensor pattern S2, the sensor pattern S2 outputs a pulse signal. After the pulse signal is binarized by a binarization circuit (not shown), the binary signal is inputted as a conversion start signal to the A/D converter 43. The A/D converter 43 effects A/D conversion of the output signal of the integrator 42. After the A/D conversion, the A/D converter outputs a conversion end signal to the main control section 51.

Receiving the conversion end signal, the main control section 51 reads the output from the A/D converter 43. When the read A/D conversion output is smaller than a desired value, the main control section 51 increases the output of the corresponding laser oscillator. When the read A/D conversion output is greater than the desired value, the main control section 51 decreases the output of the corresponding laser oscillator. Those operations are repeated until the A/D conversion output has reached the desired value.

Figure 8:
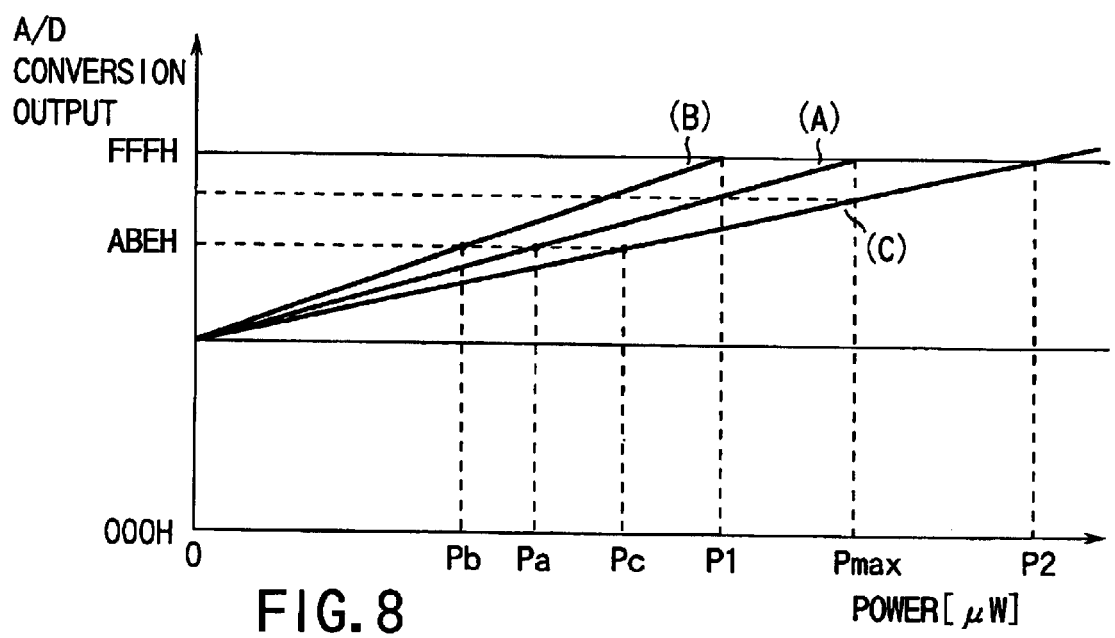
FIG. 8 is a graph showing a power sensing characteristic of the power sensing section.

Since the photodiode constituting the sensor pattern SH output the current proportional to the amount of light, a power sensing characteristic line as shown by (A) in FIG. 8 is obtained. The vertical axis indicates the output of the A/D converter and the horizontal axis represents the laser power at the surface of the sensor patterns equivalent to the image surface, outputted from the semiconductor laser oscillator 31. In the example of FIG. 8, it is desirable that the A/D converter 43 should output FFFH only when the output of the semiconductor laser oscillator 31 has increased and reached Pmax. However, a power sensing characteristic line (B) or (C) in FIG. 8 may be obtained because of variations in the sensitivity of the photodiodes constituting the sensor pattern SH or variations in the resistance values of the current/voltage conversion resistors (Rf1 to Rfn). The characteristic line (B) is obtained when the sensitivity of the photodiodes is higher than the specification value or when the resistance values of the current/voltage conversion resistors are larger than the design values. Additionally, the characteristic line (C) is obtained when the sensitivity of the photodiodes is lower than the specification value or when the resistance values of the current/voltage conversion resistors are smaller than the design values.

When the desired power is Pa [$\mu$W], the power sensing control adjusts the output of the laser oscillator so that the A/D conversion output may be, for example, ABEH. In the power sensing characteristic line (B), when the output of the laser oscillator has been adjusted to ABEH, the power is Pb [$\mu$W], which is smaller than Pa. In the power sensing characteristic line (C), the power is adjusted to Pc [$\mu$W], which is greater than Pc [$\mu$W].

When the maximum power Pmax [$\mu$W] is set as the desired power, the adjustment is made to FFFH. In the power sensing characteristic line (B), the power is adjusted to P1 [$\mu$W] smaller than Pmax [$\mu$W]. In the power sensing characteristic line (C), the power is adjusted to P2 [$\mu$W] greater than Pmax [$\mu$W] (provided that the laser oscillator can output P2 [$\mu$W] of power).

Those attribute to variations in the output of the laser oscillator from one optical device to another.

To overcome this problem, an adjustment variable resistor VR is provided behind the operational amplifier A1 as shown in FIG. 6 in the first embodiment, thereby absorbing variations in the sensitivity of the sensor pattern (photodiodes) SH or variations in the resistance values of the current/voltage conversion resistors (Rf1 to Rfn). Namely, the variable resistor VR changes the integration constant and performs correction.

Figure 9:
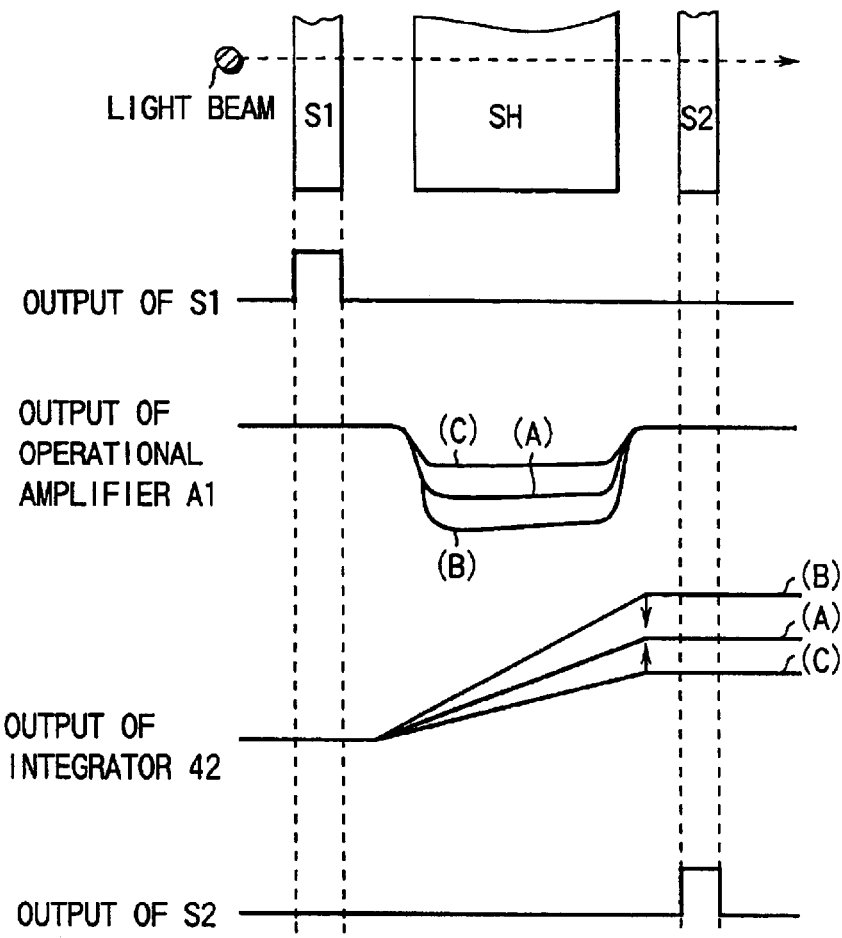
FIG. 9 is a waveform diagram to help explain the operation of the main part of the power sensing section.

For example, as shown in FIG. 9, since in the power sensing characteristic line (B) of FIG. 8, the output of the operational amplifier A1 is greater than in the power sensing characteristic line (A), the resistance value of the variable resistor VR is increased. This increases the integration constant (making the integration insensitive or slow), which approximates the characteristic line (B) to the characteristic line (A). Additionally, since in the power sensing characteristic line (C), the output of the operational amplifier A1 is smaller than in the power sensing characteristic line (A), the resistance value of the variable resistor VR is decreased. This decreases the integration constant (making the integration sensitive or fast), which approximates the characteristic line (C) to the characteristic line (A).

Figure 10:
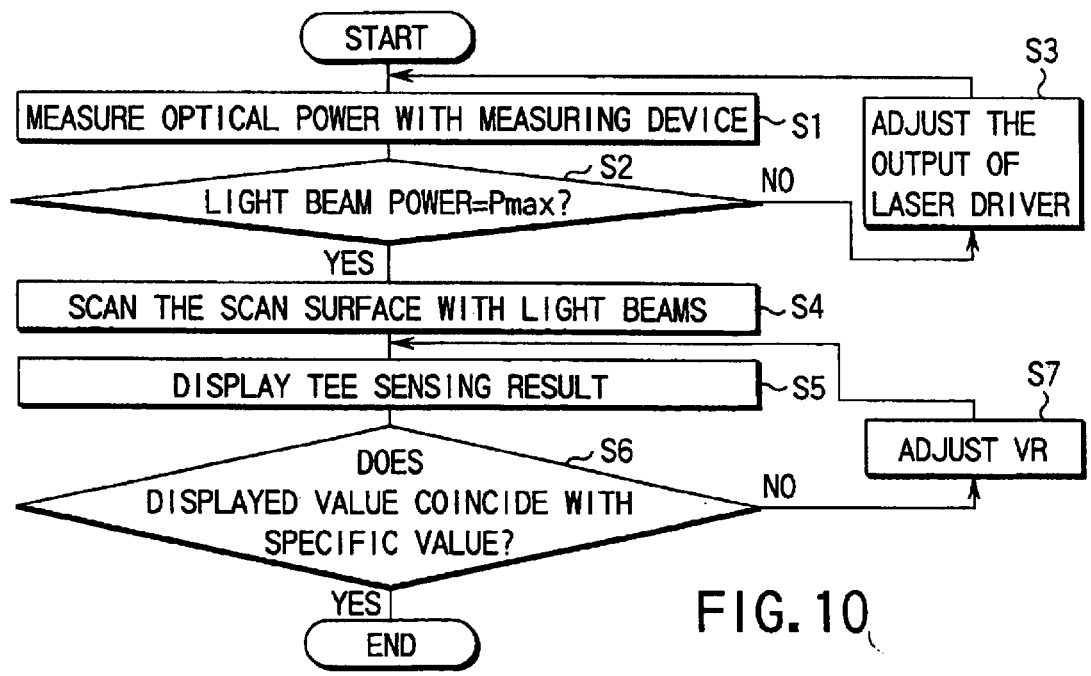
FIG. 10 is a flowchart for the operation of a second embodiment of the present invention.

Hereinafter, a method of adjusting the variable resistor VR will be explained by reference to the flowchart of FIG. 10.

The amplification factor is set and the selection of a sensor is performed as a preparation. In the embodiment, the specific power is assumed to be Pmax. Then, a suitable value is set in the laser driver 32 beforehand using a measuring device, such as an optical. power meter, so that the output of the laser oscillator 31 may reach Pmax on the surface (image surface) of the sensor pattern SH (steps S1 to S3). The scan surface is scanned with the light beam of specific power (step S4).

As the light beam passes over the sensor pattern SH, the main control section 51 reads the information on the power sensing section and displays the information on the control panel 53 (step S5). The operator changes the resistance value of the variable resistor VR from a large value to a small value (or the amplification factor from a small value to a large value), thereby adjusting the variable resistor VR to the point where the indicated value changes from FFEH to FFFH (steps S5 to S7), while watching the display on the control panel 53.

With the first embodiment, errors in the power sensing caused by variations in the sensitivity of the photodiodes or variations in the resistance values of the conversion resistors of the operational amplifier A1 are corrected by the correction variable resistor VR provided in the power sensing section. Moreover, use of the variable resistor VR reduces variations in the power sensing characteristic remarkably. Furthermore, the present invention enables the desired laser power to be generated even when there are variations in the outputs of the semiconductor laser oscillators, which makes it possible for each semiconductor laser oscillator and each image forming device to generate uniform laser power.

Hereinafter, a second embodiment of the present invention will be explained.

Figure 11:
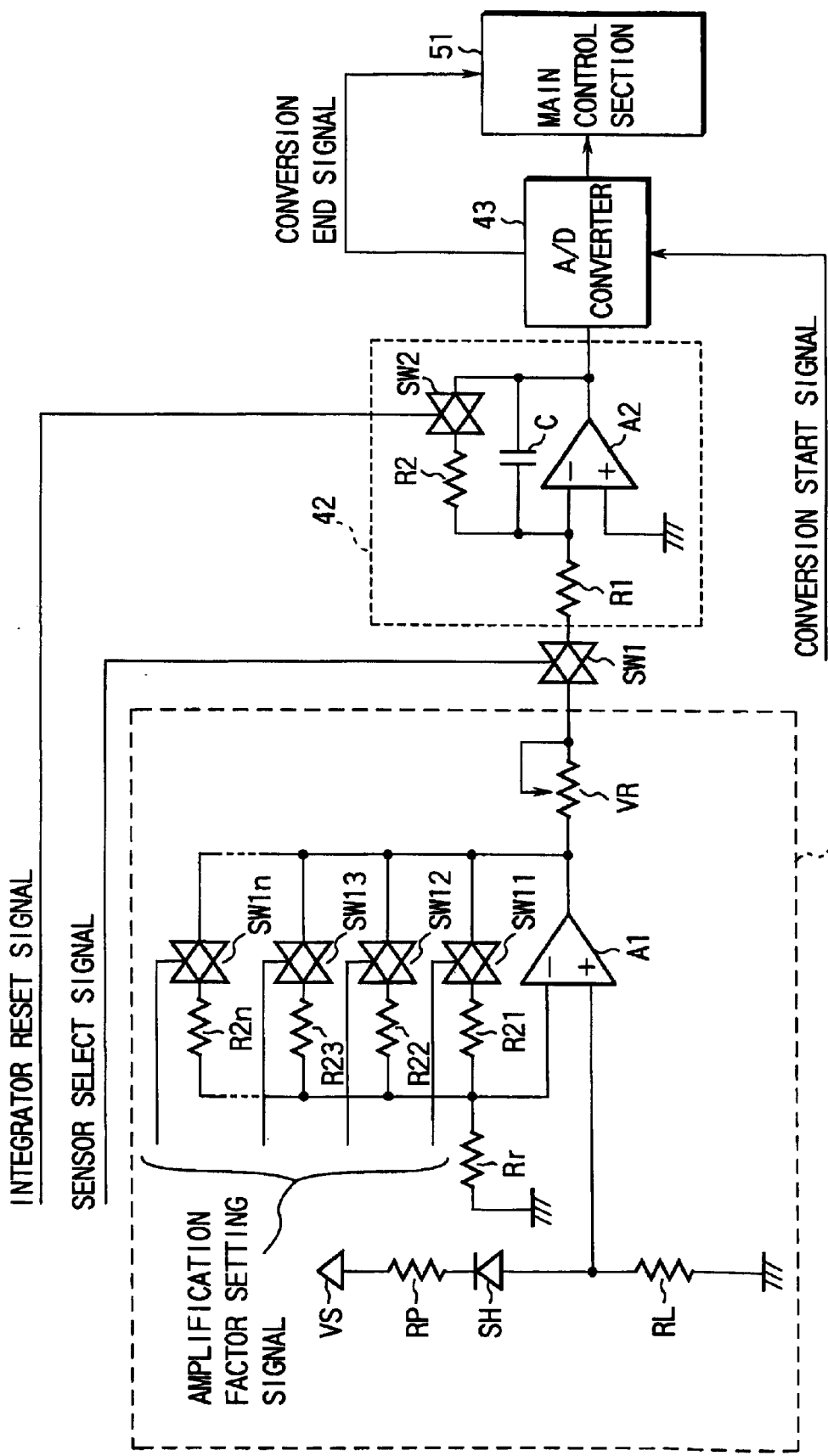
FIG. 11 is a detailed circuit diagram of the light beam power sensing section in the second embodiment.

FIG. 11 is another detailed circuit diagram of the light beam power sensing section in the light beam sensor output processing circuit 40. The light beam power sensing section of FIG. 11 differs from that of FIG. 6 in that the reference voltage is set at the ground potential (the voltage at the noninverting input terminal of the operational amplifier is 0V when no current flows in the sensor pattern) and the grounded resistor RL provides current/voltage conversion of the output current of the sensor pattern SH and that the operational amplifiers A1 and A2 are operated from a positive and a negative power supply (e.g., ±2.5V).

The part of the amplifier 99 differing from that of FIG. 6 will be explained. The power sensor pattern (photodiode) SH has its cathode connected to a direct-current power supply VS via a resistor RP and its anode connected not only to the noninverting input terminal of an operational amplifier A1 acting as a current/voltage conversion amplifier but also to the ground via the resistor RL.

Between the inverting input terminal of the operational amplifier A1 and the output terminal, resistors R21, R22, . . . , R2n are connected in parallel, with analog switches Sw11, SW12, . . . , SW1n being connected in series with the resistors R21, R22, . . . , R2n, respectively. The inverting input terminal of the operational amplifier A1 is grounded via the resistor RL. On/off control of the analog switches SW11, SW12, . . . , Sw1n is performed using the amplification factor setting signal from the main control section 51. The noninverting input terminal of the operational amplifier A2 in the integrator 42 is grounded.

The second embodiment also produces similar effects to those of the first embodiment.

Hereinafter, a third embodiment of the present invention will be explained.

In an image forming apparatus with a multi-beam optical system, when a malfunction has occurred in the laser oscillators or galvanomirrors, light-beam passing position control in the feed direction is not performed properly, degrading the picture quality seriously. In this case, a message, such as an error message or a serviceman call, is generally displayed and the apparatus cannot be used. When the image forming apparatus with the multi-beam optical system, which features high-speed copying, is left out of use (or in the down state), this gives the users a lot of trouble.

To overcome this problem, the third embodiment forms images without using the faulty laser oscillator or galvanomirror that has malfunctioned, when the apparatus has fallen into the above state, which enables the copying to be continued until a serviceman has repaired the apparatus. A detailed explanation will be given below.

Figure 12:
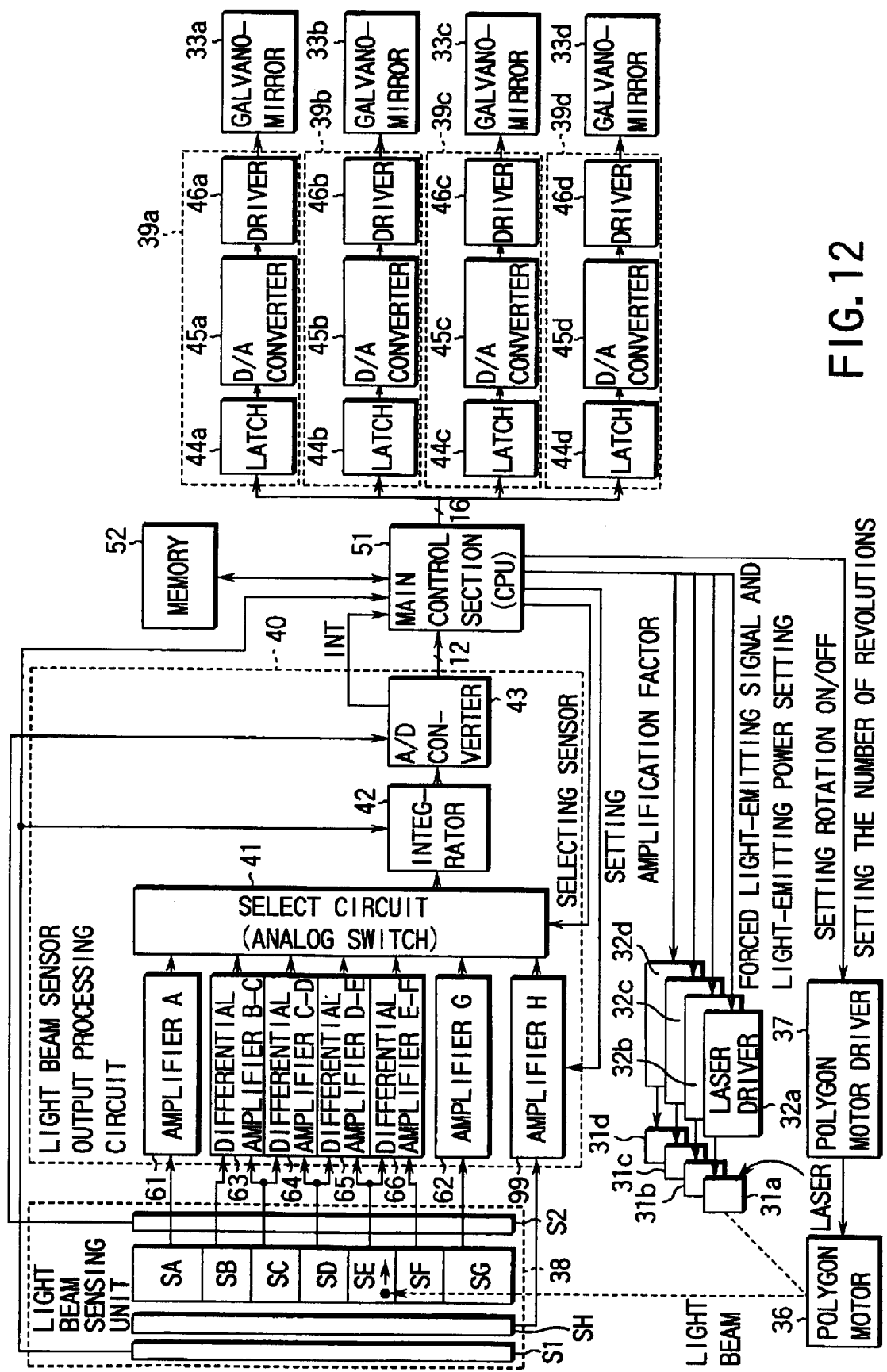
FIG. 12 is a block diagram to help explain the passing position control of a light beam using the light beam sensing unit of FIG. 4 in a third embodiment of the present invention.

FIG. 12 is a block diagram to help explain the passing position control of the light beam when the light beam sensing unit 38 of FIG. 4 is used. The basic configuration is the same as that of FIG. 5 except that a signal line for transferring the output of the sensor pattern S1 to the main control section 51 is added. Using the output of the sensor pattern S1, abnormalities in the laser oscillators 31*a*, 31*b*, 31*c*, 31*d* and galvanomirrors 33*a*, 33*b*, 33*c*, 33*d* are sensed. Hereinafter, malfunction sensing will be described.

To sense abnormalities, the polygon mirror 35 is rotated at a specific speed. Next, the light beam to be deflected (the first light beam a in the third embodiment) is turned on and the galvanomirror corresponding to the light beam is operated in such a manner that it has the maximum deflection angle (although the deflection may be upward or downward, a case where the light beam is deflected up toward the sensor pattern SA will be explained).

Next, the galvanomirror is moved downward in rough steps. Since the size of the sensor pattern in the vertical direction is about 2 mm in the third embodiment, it is assumed that the galvanomirror is moved in steps of about 100 $\mu$m. If neither the galvanomirror nor laser oscillator malfunctions, the light beam never fails to pass over the sensor pattern S1, which then outputs a signal.

When receiving the output of the sensor pattern S1, the main control section 51 judges that neither the first laser oscillator 31*a* nor the first galvanomirror 33*a* malfunctions and senses a malfunction in the second light beam b in the same method as described above. On the other hand, if the sensor pattern S1 has outputted no signal, the main control section 51 judges that either the first laser oscillator 31*a* or the first galvanomirror 33*a* has malfunctioned.

The main control section 51 performs the above operation on all of the light beams and senses a malfunction in the laser oscillators and galvanomirrors. The malfunction sensing is done periodically or at the time when the power supply is turned on.

As a result of the malfunction sensing, when it is found that either a laser oscillator or a galvanomirror has malfunctioned, this is displayed on the control panel 53. From this time on, the operation of the faulty laser oscillator or galvanomirror is stopped. Then, the remaining good laser oscillators and galvanomirrors are used to form an image.

For example, when the laser oscillator 31*a* has malfunctioned, the remaining good laser oscillators 31*b*, 31*c*, 31*d* are used to form an image. Similarly, for example, when the laser oscillator 33*a* has malfunctioned, the remaining good laser oscillators 33*b*, 33*c*, 33*d* are used to form an image. Namely, when of the four light beams, there is a malfunction in the first light beam a, the remaining good second, third, and fourth light beams b, c, and d are used to form an image.

Figure 13B:
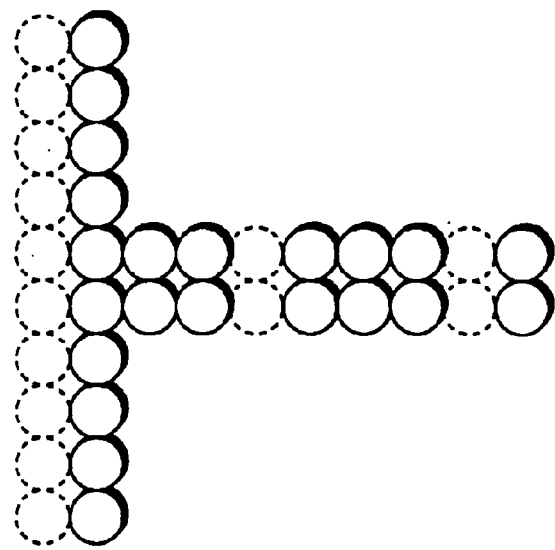
FIGS. 13A and 13B are illustrations to help explain the image forming operation in the third embodiment.
Figure 13A:
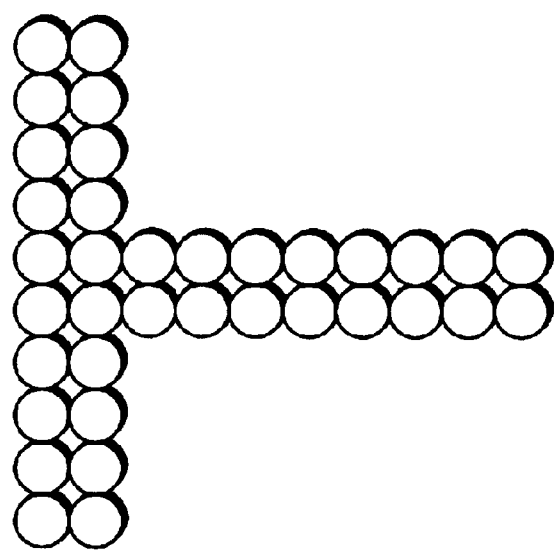

Because the image of the first light beam a is missing as shown by the broken lines in FIG. 13B as compared with the proper recording state shown in FIG. 13A, it is natural that the picture quality degrades. In high-speed copying, however, the apparatus has the great. advantage of being able to continue copying even when there has been a malfunction in the laser oscillators or galvanomirrors.

In this case, for example, the message "the image is degraded because the light beam device (laser oscillator or galvanomirror) has malfunctioned" is displayed on the control panel, thereby informing the user of the apparatus.

With the third embodiment, when one of the laser oscillators or galvanomirrors has malfunctioned in an image forming apparatus with a multi-beam optical system, the remaining good light beams are used to form an image without using the light beam corresponding to the faulty laser oscillator or galvanomirror. This shorten the time during which the work of the user of the image forming apparatus is interrupted, although the picture quality deteriorates a little as compared with a case where all the light beams are good.

Hereinafter, a fourth embodiment of the present invention will be explained.

The fourth embodiment does not use the faulty laser oscillator or galvanomirror but use the remaining good laser oscillators and galvanomirrors and further converts the image data according to the number of the remaining good light beams (600 dpi, 4 beams is converted into 600 dpi, 3 beams). As a result, even when one of the laser oscillators or galvanomirrors has malfunctioned, the fourth embodiment forms an image without degrading the picture quality. A detailed explanation will be given below.

Figure 14:
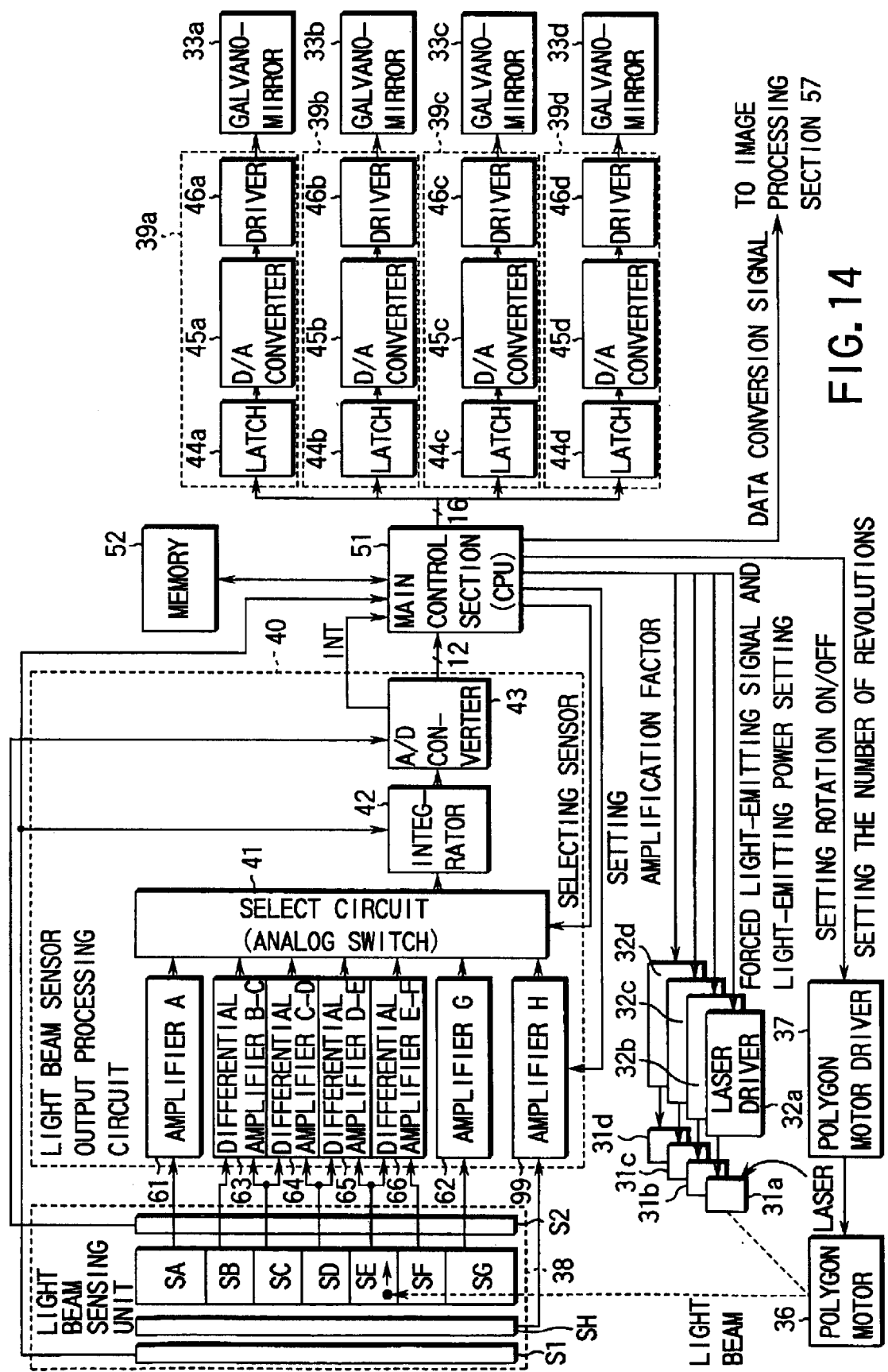
FIG. 14 is a block diagram to help explain the passing position control of a light beam using the light beam sensing unit of FIG. 4 in a fourth embodiment of the present invention.

FIG. 14 is a block diagram to help explain the passing position control of the light beam when the light beam sensing unit 38 of FIG. 4 is used. The fourth embodiment has basically the same configuration as that of FIG. 10 except that a signal line for transferring a data conversion signal from the main control section 51 to the image processing section 57 is added. Receiving the data conversion signal from the main control section 51, the image processing section 57 converts the image data according to the change (decrease) of the number of light beams.

Since a method of sensing a malfunction in the laser oscillators and galvanomirrors is the same as that in the third embodiment, its explanation will be omitted.

If malfunction sensing has shown that either a laser oscillator or a galvanomirror has malfunctioned, this is displayed on the control panel 53. From this time on, the operation of the faulty laser oscillator or galvanomirror is stopped. Then, the remaining good laser oscillators and galvanomirrors are used to form an image.

The fourth embodiment is characterized in that the image processing section 57 converts the image data according to the decrease of the number of light beams, thereby forming an image without degrading the picture quality. Hereinafter, explanation will be given, provided that there has been a malfunction in the first light beam a.

When there has been a malfunction in the first light beam a, a malfunction message is displayed on the control panel 53, thereby urging the user to call a serviceman. Thereafter, to perform data conversion as a result of the decrease of the number of light beams, the main control section 51 transmits a data conversion signal to the image processing section 57.

Figures 15A, 15B:
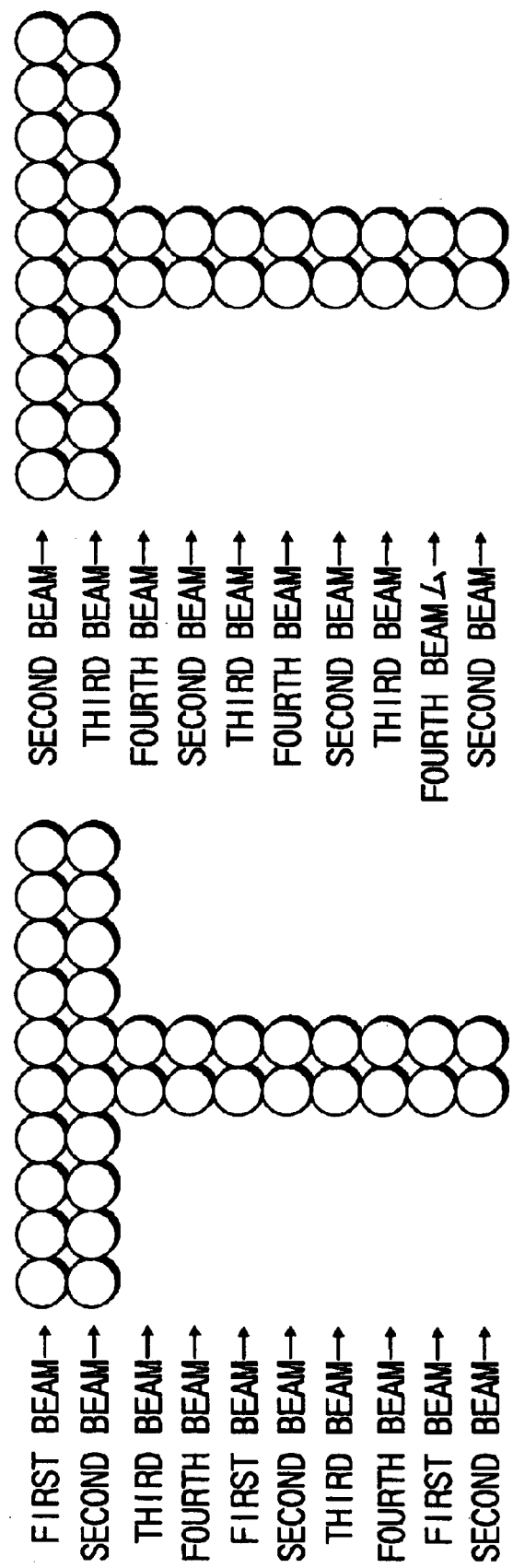
FIGS. 15A and 15B are illustrations to help explain the image forming operation in the fourth embodiment;.

Receiving the data conversion signal, the image processing section 57 converts the image data according to the change of the number of light beams (from 4 beams to 3 beams). Specifically, as shown in FIG. 15B, the image processing section 57 allocates the data of the first light beam a to the second light beam b, the data of the second light beam b to the third light beam c, and the data of the third light beam c to the fourth light beam d (one scan after the conversion). Furthermore, the image processing section 57 converts the data of the fourth light beam d into the second light beam b, the data of the first light beam a in the next scanning into the third light beam c, and the data of the second light beam b into the fourth light beam d. Thereafter, the image processing section 57 repeats the above conversion until the last data has been converted. FIG. 15A shows a recording state in normal operation.

Furthermore, the main control section 51 outputs the data conversion signal and at the same time, changes the number Rp of revolutions of the drum motor for driving the photosensitive drum 15 as expressed by equation (3):

$$Rp2 = Rp1 \times \frac{n-m}{n} \quad (3)$$

where Rp1 is the number of revolutions of the drum motor in normal operation,

Rp2 is the number of revolutions of the drum motor when a malfunction has occurred in the light beam, n is the number of light beams the apparatus originally has, and m is the number of light beams in which abnormalities have occurred.

Moreover, the sheet transfer speed is also changed according to the change of the number of revolutions of the drum motor.

This makes it possible to form an image without degrading the picture quality, in spite of decreasing the number of light beams, although the copying speed gets a bit slower. In this case, for example, the message "the copying speed has dropped because the light beam device (laser oscillator or galvanomirror) has malfunctioned" is displayed on the control panel 53, thereby informing the user of the apparatus.

Since the remaining operation is the same as the normal sequence excluding the part related to the first light beam, its explanation will be omitted.

With the fourth embodiment, when one of the laser oscillators or galvanomirrors has malfunctioned, the image processing section uses the remaining good light beams to perform image data conversion to form an image with the same resolution as that in normal operation. Consequently, although the copying speed gets a bit slower than when all the light beams are good, there is no deterioration in the picture quality. In addition, the time during which the work of the user of the image forming apparatus is interrupted is shortened.

Hereinafter, a fifth embodiment of the present invention will be explained.

If a malfunction has occurred in one of the laser oscillators or galvanomirrors, the fifth embodiment does not use the faulty laser oscillator or galvanomirror but use the remaining good laser oscillators and galvanomirrors and further performs resolution conversion according to the number of the remaining good light beams (600 dpi, 4 beams is converted into 600 dpi, 3 beams). This enables an image to be formed without degrading the picture quality. A detailed explanation will be given below.

Figure 16:
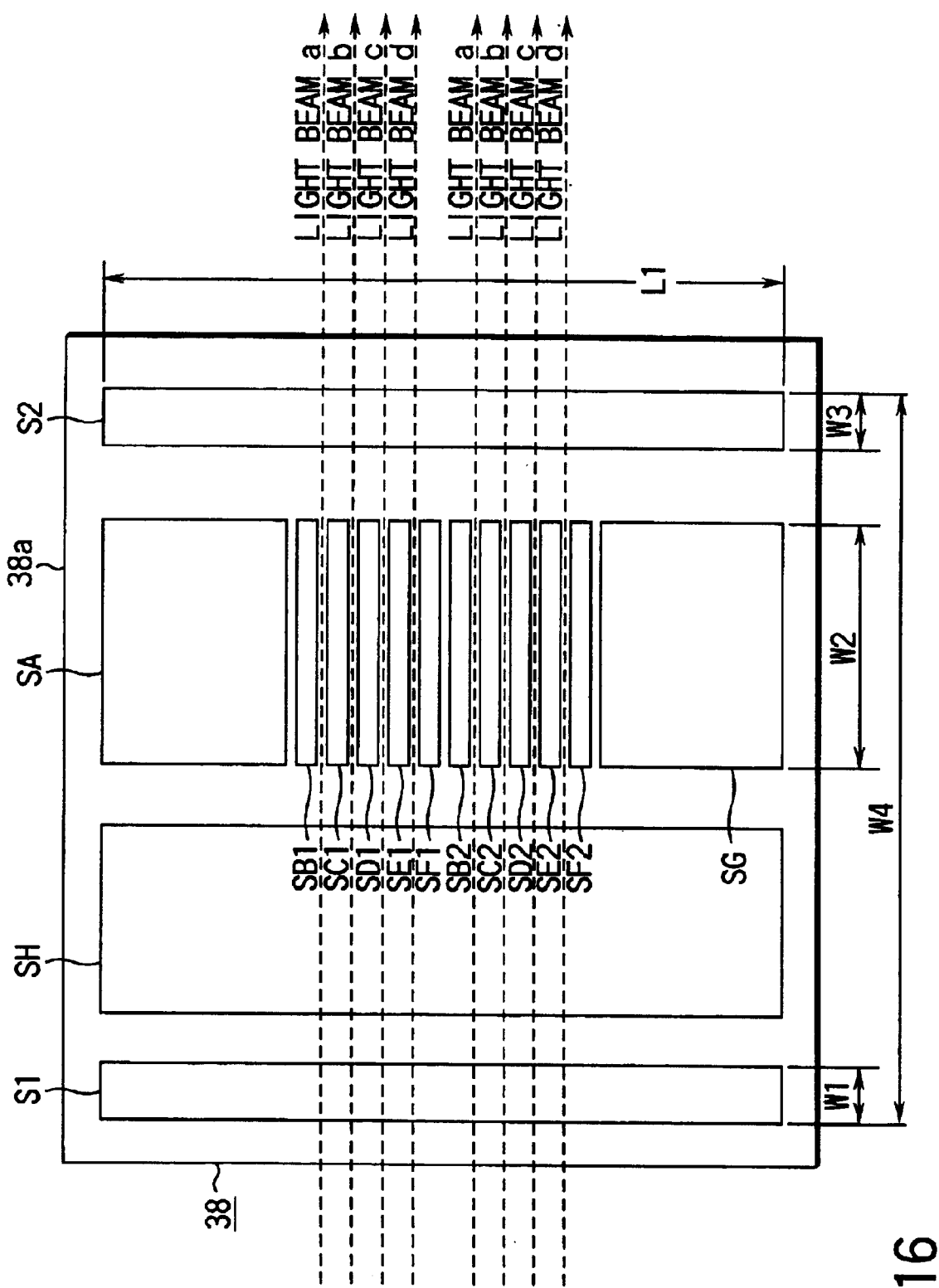
FIG. 16 schematically shows the configuration of a light beam sensing unit according to a fifth embodiment of the present invention.

FIG. 16 shows the relationship between the structure of the light beam sensing unit 38 with two types of resolution and the direction of light-beam scanning. The light beam sensing unit 38 of FIG. 16 differs from that of FIG. 4 in that the sensor patterns SB to SF for sensing the passing positions of the light beams are provided for the two types of resolution. Since the remaining part is the same as the light beam sensing unit 38 of FIG. 4, its detailed explanation will be omitted.

The sensor pattern SB1 to SF1 are first resolution (e.g., 600 dpi) light-beam passing position sensor patterns of the same shape (with the same area) and are arranged at intervals of about 42.3 $\mu$m (25.4 mm÷600). The passing positions of the light beams a to d are controlled in such a manner that they pass through between the respective adjacent sensor patterns, thereby scanning the sensor patterns at intervals of 42.3 µm.

Furthermore, the sensor pattern SB2 to SF2 are second resolution (e.g., 400 dpi) light-beam passing position sensor patterns of the same shape (with the same area) and are arranged at intervals of about 63.5 µm (25.4 mm÷400). The passing positions of the light beams a to d are controlled in such a manner that they pass through between the respective adjacent sensor patterns, thereby scanning the sensor patterns at intervals of 63.5 µm.

Figure 17:
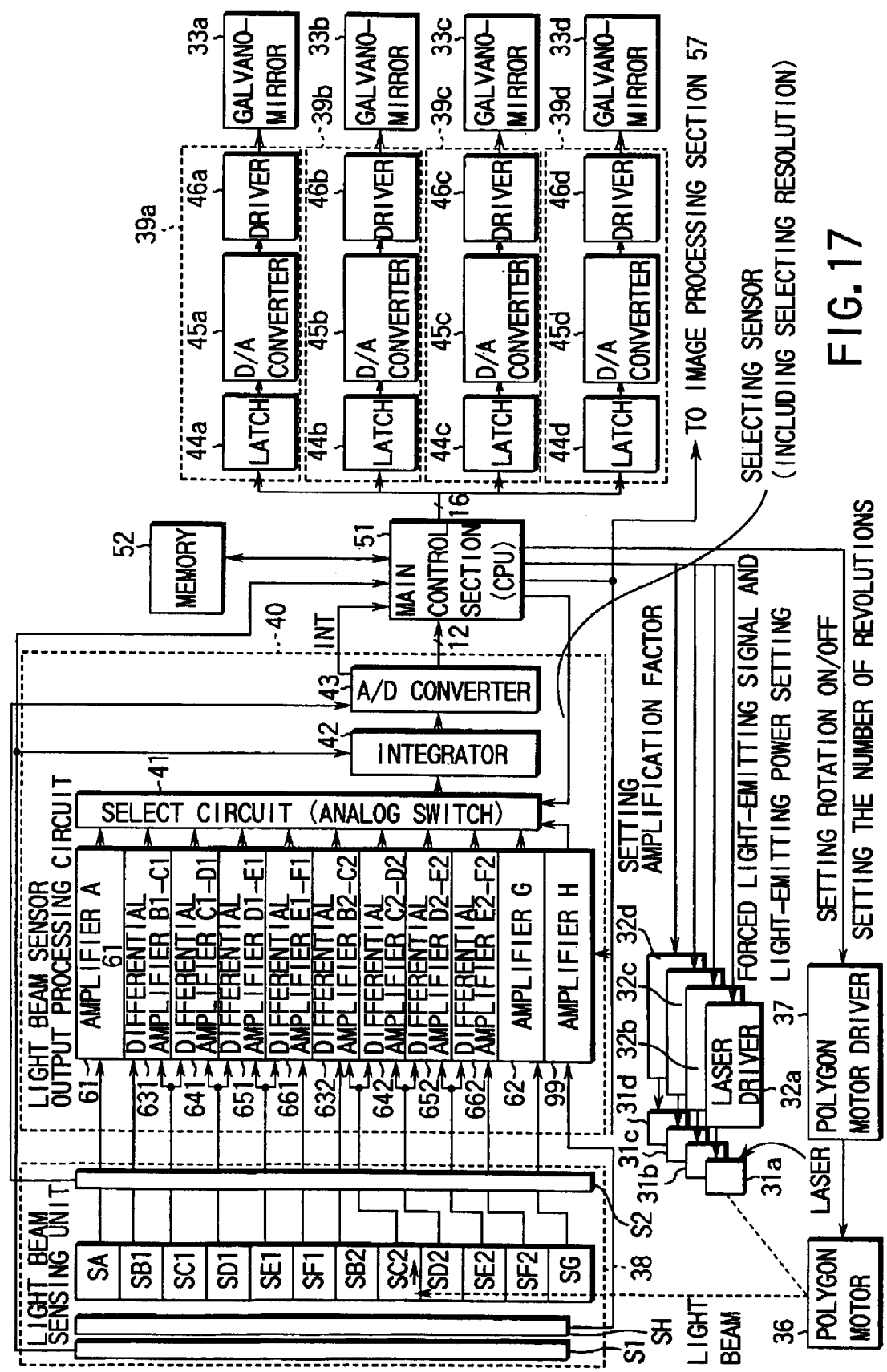
FIG. 17 is a block diagram to help explain the passing position control of a light beam using the light beam sensing unit of FIG. 16 in the fifth embodiment.

FIG. 17 is a block diagram to help explain the passing position control of the light beam when the light beam sensing unit 38 of FIG. 16 is used. The light beam sensing unit 38 of FIG. 17 differs from that of FIG. 5 in that differential amplifiers are provided for the respective sensor patterns SB1 to SF1 and SB2 to SF2 in the light beam sensor output processing circuit 40 and a resolution select signal is added to the sensor select signal. Since the remaining configuration is basically the same as that of FIG. 5, its detailed explanation will be omitted.

A differential amplifier 631 amplifies the difference between the outputs of the sensor patterns SB1 and SC1 and a differential amplifier 641 amplifies the difference between the outputs of the sensor patterns SC1 and SD1. Similarly, differential amplifiers 651, 661, 632, 642, 652, and 662 amplify the difference between the output signals of adjacent ones of the sensor patterns SD1 to SF2.

The output signals of the amplifiers 631 to 661, 632 to 662 are inputted to the select circuit (analog switch) 41. On the basis of the sensor select signal from the main control section (CPU) 51, the select circuit 41 selects the signal to be inputted to the integrator 42.

Specifically, when the light-beam passing position control is performed at the first resolution (600 dpi), the select circuit 41 selects the following differential amplifiers and the passing position control of the corresponding light beam is performed:

Differential amplifier 631: light beam a.
Differential amplifier 641: light beam b.
Differential amplifier 651: light beam c.
Differential amplifier 661: light beam d.

Similarly, when the light-beam passing position control is performed at the second resolution (400 dpi), the select circuit 41 selects the following differential amplifiers and the passing position control of the corresponding light beam is performed:

Differential amplifier 632: light beam a.
Differential amplifier 642: light beam b.
Differential amplifier 652: light beam c.
Differential amplifier 662: light beam d.

Furthermore, the light beam sensing unit 38 of FIG. 17 differs from that of FIG. 5 in that the main control section 51 outputs the sensor select signal including the resolution select signal to not only the select circuit 41 but also the image processing section 57 and that the output of the sensor pattern S1 is also connected to the main control section 51. The sensor select signal is needed in changing the number of light beams and converting the resolution. The connection to the main control section is needed in sensing a malfunction in the galvanomirrors and laser oscillators. If malfunction sensing has shown that either a laser oscillator or a galvanomirror has malfunctioned, this is displayed on the control panel 53. From this time on, the operation of the faulty laser oscillator or galvanomirror is stopped. Then, the remaining good laser oscillators and galvanomirrors are used to form an image.

The fifth embodiment is characterized in that the image processing section 57 converts the image data according to the decrease of the number of light beams and the change of the resolution, thereby forming an image without degrading the picture quality. Hereinafter, explanation will be given, provided that there has been a malfunction in the first light beam a. When there has been a malfunction in the first light beam a, a malfunction message is displayed on the control panel 53. Thereafter, to perform resolution conversion, the main control section 51 transmits a resolution conversion signal (and data conversion signal) to the image processing section 57. Receiving the data conversion signal, the image processing section 57 converts the image data according to the number of the remaining light beams (three beams) and the change of the resolution (from 600 dpi to 400 dpi).

The main control section 51 outputs the data conversion signal and simultaneously sets the revolution speed of the drum motor for driving the photosensitive drum 15 at a revolution seed corresponding to the changed resolution.

In this case, for example, the message "the copying speed has dropped because the light beam device (laser oscillator or galvanomirror) has malfunctioned" is displayed on the control panel 53, thereby informing the user of the apparatus.

Next, the power control of the three good light beams is performed and then the light beam passing position control in the direction of feed is performed. A detailed explanation of the two controls has been given in Japanese Patent Application No. 9-257351. Since the fifth embodiment uses the three good light beams at a resolution of 400 dpi, the respective light beams are controlled to the following positions:

The first light beam a: not used.
The second light beam b: in the middle between sensor patters SC2 and SD2.
The third light beam c: in the middle between sensor patters SD2 and SE2.
The fourth light beam d: in the middle between sensor patters SE2 and SF2.

This controls the passing position of the light beam with a pitch of 400 dpi.

With the fifth embodiment, when a malfunction has occurred in one of the laser oscillators and galvanomirrors, the image processing section performs image data conversion and resolution conversion to form an image using the remaining good light beams. Consequently, although the resolution decreases a little, there is no deterioration in the picture quality. In addition, the work of the user of the image forming apparatus is prevented from being stopped.

As descried above in detail, with the present invention, it is possible to provide an image forming apparatus capable of absorbing not only variations in the power sensing characteristic caused by variations in the sensitivity of the light sensing elements or variations in the amplification factors of the current/voltage converters but also variations in the output power of the semiconductor laser oscillators and thereby constantly forming an image with the desired laser power. Namely, it is possible to provide an image forming apparatus capable of forming a high-quality image without any difference in density in the output image.

Furthermore, with the present invention, it is possible to provide an image forming apparatus capable of continuing to form an image without stopping until a serviceman has repaired the apparatus, if one of the light beam generating means or optical path deflection means has malfunctioned in an image forming apparatus with a multi-beam optical system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:
plural light beam generating means each for generating a light beam;
scanning means for scanning a scan surface simultaneously with the light beams generated by said plural light beam generating means;
light beam position sensing means for sensing passing positions of the light beams, the light beams being directed by the scanning means;
malfunction sensing means for sensing a malfunction using said light beam position sensing means; and
control means for stopping the light-emitting operation of the light beam generating means that has malfunctioned, when the malfunction sensing means has sensed that a malfunction has occurred in the light beam generating means, and continuing to form an image by the operation of the remaining good light beam generating means.

2. The light beam scanning apparatus according to claim 1 further comprising:
calculation means for calculating an amount of deflection of the optical path to deflect the passing positions of said light beams to desired positions on said scan surface on the basis of each sensing result of the light beam position sensing means;
optical path deflection means which is provided for said light beams and is used to change the passing positions of said light beams on said scan surface on the basis of the amount of deflection of optical path calculated at said calculation means.

3. The light beam scanning apparatus according to claim 2, further comprising guide display means for informing the user of the apparatus of the malfunction state by displaying a guide, when said malfunction sensing means has sensed that a malfunction has occurred in the light beam generating means.

4. The light beam scanning apparatus according to claim 2, further comprising:
resolution conversion means for, when said malfunction sensing means has sensed that a malfunction has occurred in the light beam generating means, converting the resolution during image formation according to the number of the remaining good light beam generating means excluding the light beam generating means that has malfunctioned.

5. The light beam scanning apparatus according to claim 4, wherein the light beam position sensing means includes a group consisting of plural light sensing elements arranged in parallel with each other in a direction orthogonal to the scanning direction of the plural light beams, at intervals corresponding to plural resolutions.

6. The light beam scanning apparatus according to claim 2, wherein the malfunction occurs in one of said plural light beam generating means and said optical path deflection means.

7. The light beam scanning apparatus according to claim 2, wherein said optical path deflection means comprises a galvanomirror.

8. An image forming apparatus comprising:
plural light beam generating means each for generating light beams;
scanning means for scanning a scan surface simultaneously with the light beams generated by the light beam generating means,
an image retaining member on whose surface an electrostatic latent image is formed by the scanning of said scanning means;
a developing unit for developing the electrostatic latent image formed on said image retaining member to form a toner image;
a transfer unit for transferring said toner image onto a sheet of paper;
light beam position sensing means for sensing the passing positions of the light beams in the direction perpendicular to the direction in which the light beams scan, the light beams being directed by the scanning means;
malfunction sensing means for sensing a malfunction using said light beam position sensing means; and
control means for stopping the light-emitting operation of the light beam generating means that has malfunctioned, when the malfunction sensing means has sensed that a malfunction has occurred in the light beam generating means, and continuing to form an image by the operation of the remaining good light beam generating means.

9. The image forming apparatus according to claim 8, further comprising:
calculation means for calculating an amount of deflection of the optical path to deflect the passing positions of said light beams to desired positions on said image retaining member on the basis of each sensing result of the light beam position sensing means;
optical path deflection means which are provided for said light beams in a one-to-one ratio and are used to change each of the passing positions of said light beams on said image retaining member on the basis of the amount of deflection of each optical path calculated at said calculation means.

10. The image forming apparatus according to claim 9, further comprising guide display means for informing the user of the apparatus of the abnormal state by displaying a guide, when said malfunction sensing means has sensed that a malfunction has occurred in the light beam generating means.

11. The image forming apparatus according to claim 8, further comprising:
resolution conversion means for, when said malfunction sensing means has sensed that a malfunction has occurred in the light beam generating means, converting the resolution during image formation according to the number of the remaining good light beam generating means excluding the light beam generating means that has malfunctioned.

12. The image forming apparatus according to claim 8, wherein the malfunction occurs in one of said plural light beam generating means and said optical path deflection means.

13. The image forming apparatus according to claim 8, wherein said optical path deflection means comprises a galvanomirror.

14. The image forming apparatus according to claim 8, wherein the light beam position sensing means includes a group consisting of plural light sensing elements arranged in parallel with each other in a direction orthogonal to the scanning direction of the plural light beams, at intervals corresponding to plural resolutions.

* * * * *